(12) United States Patent
Timperman

(10) Patent No.: US 8,371,226 B2
(45) Date of Patent: Feb. 12, 2013

(54) AIR CUSHION OR WHEELED OVERHEAD GUIDEWAY SYSTEM

(76) Inventor: Eugene L. Timperman, Cincinnati, OH (US)

( * ) Notice: Subject to any disclaimer, the term of this patent is extended or adjusted under 35 U.S.C. 154(b) by 207 days.

(21) Appl. No.: 12/831,813

(22) Filed: Jul. 7, 2010

(65) Prior Publication Data
US 2011/0011298 A1    Jan. 20, 2011

Related U.S. Application Data

(60) Provisional application No. 61/225,727, filed on Jul. 15, 2009.

(51) Int. Cl.
*A63G 1/00* (2006.01)
*B61B 3/00* (2006.01)
(52) U.S. Cl. .................................. 104/23.1; 104/89
(58) Field of Classification Search .............. 104/23.1, 104/23.2, 89–91, 118
See application file for complete search history.

(56) References Cited

U.S. PATENT DOCUMENTS

| | | |
|---|---|---|
| 751,960 A | 2/1904 | Terry |
| 788,322 A | 4/1905 | Mehring |
| 1,288,930 A | 12/1918 | Laur |
| 1,846,021 A | 2/1932 | Bell |
| 2,788,749 A | 4/1957 | Hinsken et al. |
| 2,923,254 A | 2/1960 | Barthelmess |
| 3,012,519 A | 12/1961 | Bingham |
| 3,092,039 A | 6/1963 | Lich |
| 3,111,910 A | 11/1963 | Pao |
| 3,115,848 A | 12/1963 | Appelt et al. |
| 3,152,559 A | 10/1964 | Harshberger |
| 3,168,875 A | 2/1965 | Reed |
| 3,174,440 A | 3/1965 | Cockerell |
| 3,233,556 A | 2/1966 | McDonald |
| 3,238,894 A | 3/1966 | Maksim, Jr. |
| 3,527,170 A | 9/1970 | Witmer |
| 3,611,944 A | 10/1971 | Reder |
| 3,797,398 A * | 3/1974 | Bliss ........................... 104/23.2 |
| 3,799,061 A | 3/1974 | Bertin |
| 3,845,716 A | 11/1974 | Bertelsen |
| 3,938,445 A | 2/1976 | Hughes |
| 3,952,666 A | 4/1976 | Gladish |
| 4,010,693 A | 3/1977 | Bliss |
| 5,074,220 A * | 12/1991 | Petersen ........................ 104/93 |
| 6,044,770 A * | 4/2000 | Davey et al. .................. 104/282 |

FOREIGN PATENT DOCUMENTS

| | | |
|---|---|---|
| DE | 1530019 A1 | 8/1970 |
| FR | 2913653 A1 | 9/2008 |

OTHER PUBLICATIONS

International Search Report and Written Opinion, PCT/US2010/041210, Oct. 26, 2010 (16 pages).
The STAR System (Standard Technology Advanced Rail) Business Plan by TAC Engineering, Mar. 1, 2010 (91 pages).

* cited by examiner

*Primary Examiner* — Robert McCarry, Jr.
(74) *Attorney, Agent, or Firm* — K&L Gates LLP

(57) ABSTRACT

An air cushion or wheeled overhead guideway mass transit system is disclosed.

30 Claims, 31 Drawing Sheets

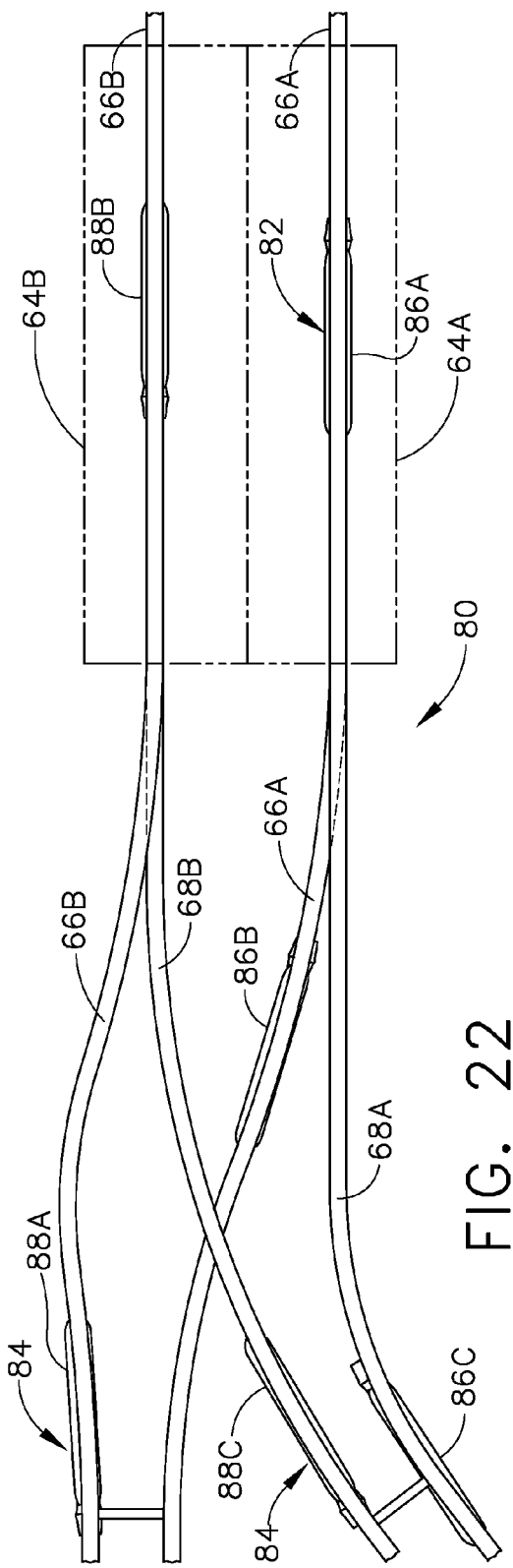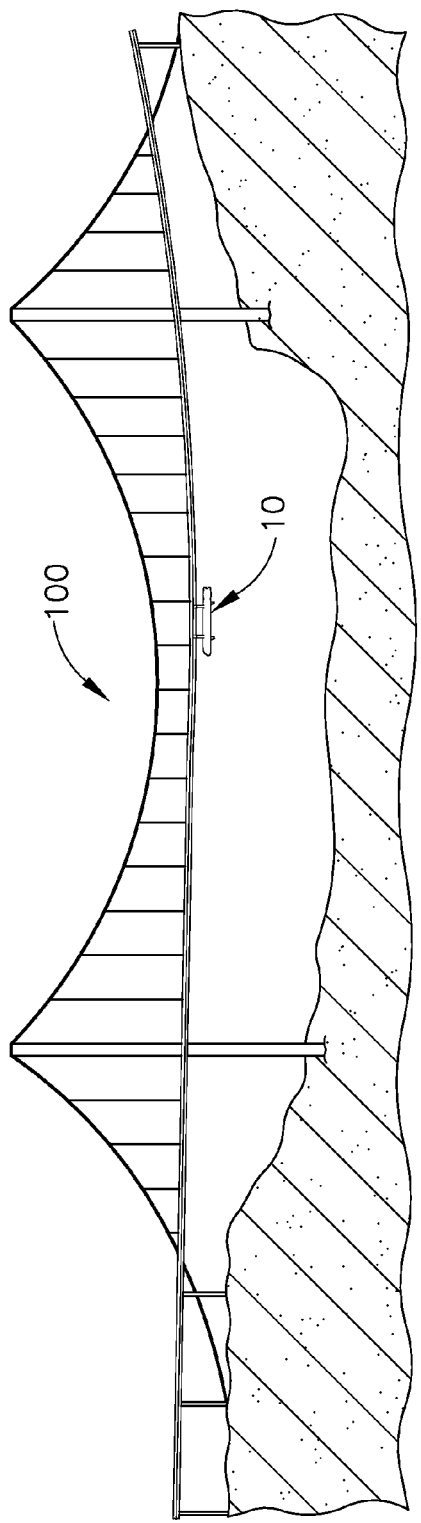

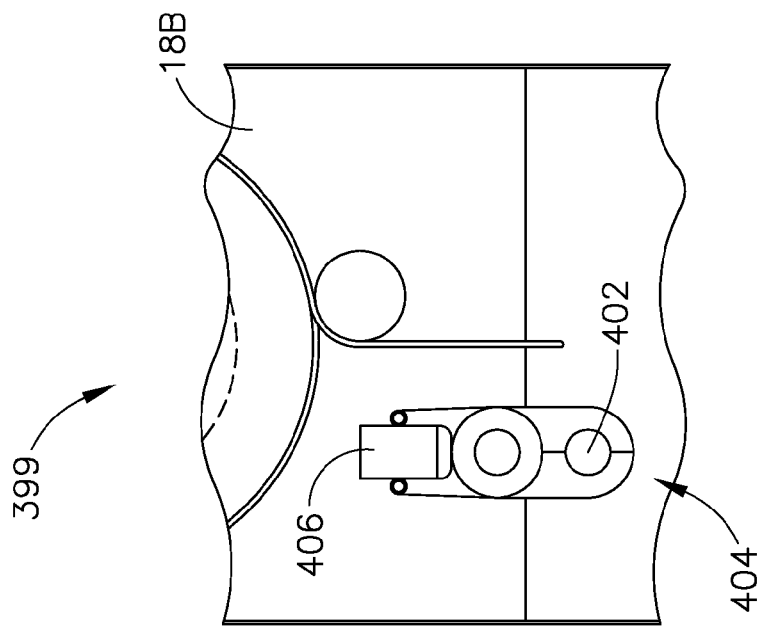
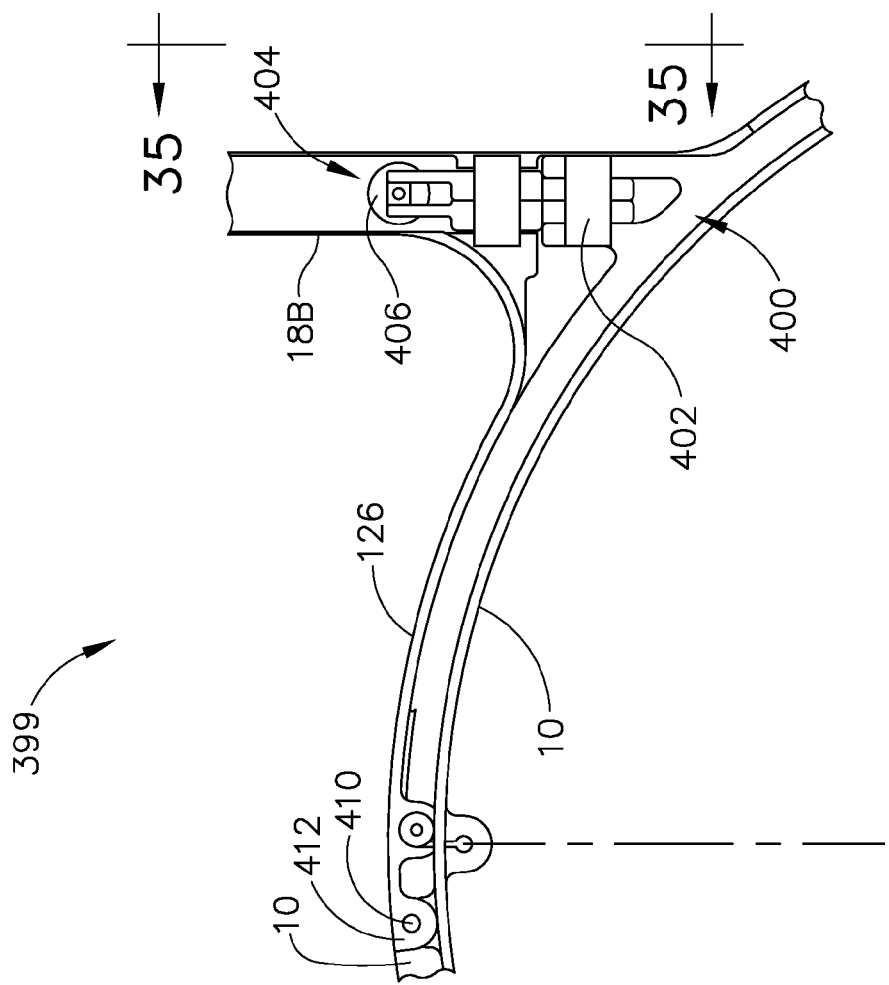

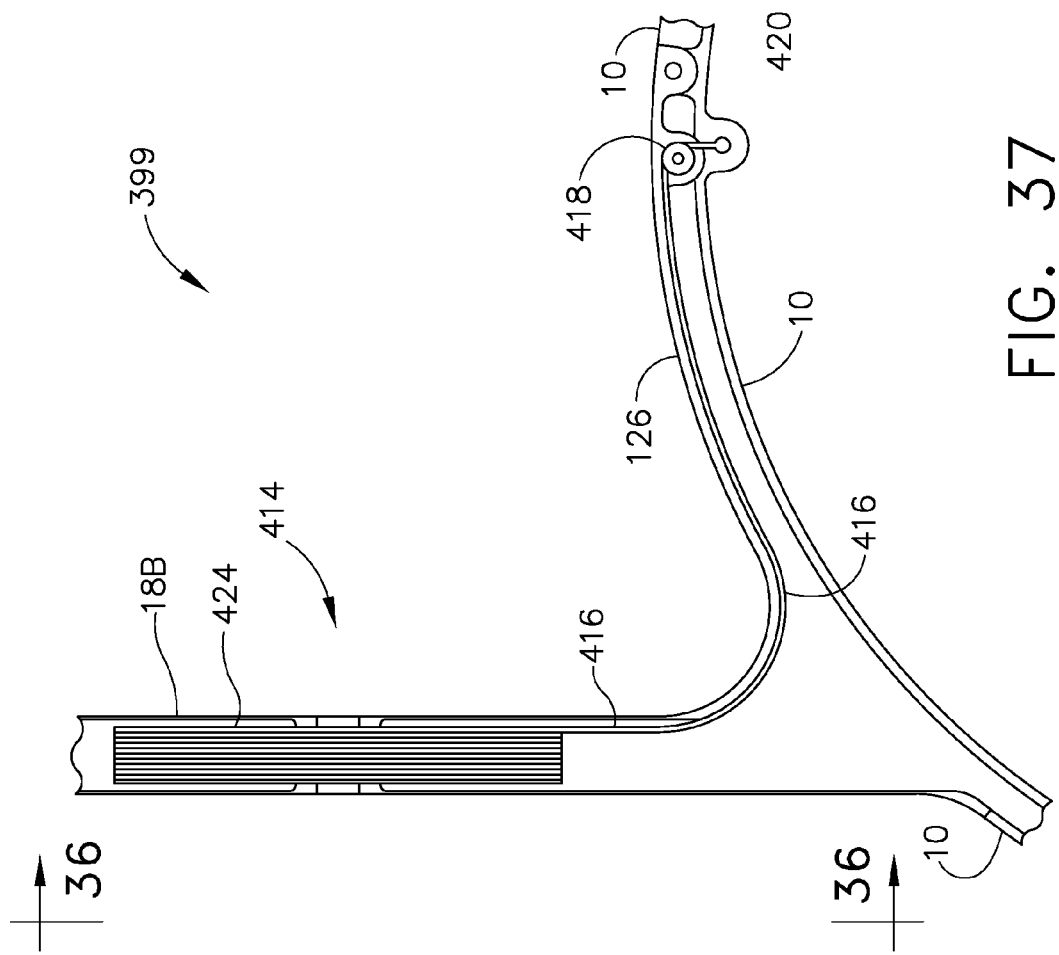
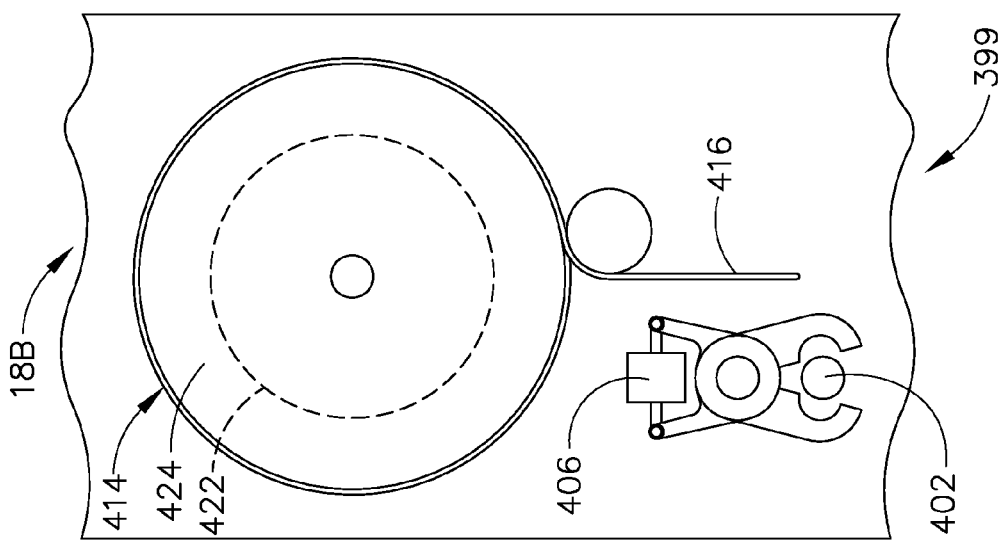

AIR CUSHION OR WHEELED OVERHEAD GUIDEWAY SYSTEM

CROSS REFERENCE TO RELATED APPLICATIONS

This nonprovisional application claims the benefit of U.S. Provisional Application No. 61/225,727, filed Jul. 15, 2009, the disclosure of which is herein incorporated by reference in its entirety.

BACKGROUND

Various embodiments of the present invention relate to mass transit systems and, more particularly to overhead ground transportation systems incorporating a passenger vehicle and suspended guideway.

As the world's population continues to increase, so does the need for economical and environmental friendly modes of transporting large numbers of people. According to at least one estimate, the United States Federal Aviation Authority is looking to double the number of commercial flights over the United States in the next ten years and triple that number in twenty years to accommodate the mass transit needs. However, that presents an enormous challenge for air traffic control that has every commercial flight on radar at all times, regardless of weather. The costs to expand the present air traffic control systems will be substantial.

The highway systems around the world are becoming more congested. Maintaining overused highways and bridges can be a staggering cost as is developing new highways. The number of automobiles in the United States and other countries continues to increase each year which leads to increased highway travel and increased maintenance and construction costs.

Many countries around the world have rail systems that serve to transport freight as well as people. For example, the rail systems in the United States were generally constructed many years ago and today most systems function well for supporting freight-laden cars where the ability to transport significant weights and quantities is more important than speed. Superimposing passenger service on these rails interferes with the movement of freight and limits passenger service to an average speed of some 39 miles per hour. Increased rail traffic will become more disruptive to auto and truck traffic at crossings as well.

Moreover, people in general have become accustomed to the convenience of personal travel and desire to move at ever increasing speeds. For example, for short trips, people first generally choose the expressway, and for longer trips, people now have to choose between ground and air travel.

A variety of mass transit systems have been developed in the past. For example, U.S. Pat. No. 3,952,666 discloses a tubular rail with an air bearing support system on the top thereof permitting free pendulum movement. U.S. Pat. No. 3,238,894 also discloses a system which purports to provide coordinated turn advantages, but the design solution is cumbersome. U.S. Pat. No. 3,174,440 utilizes a peripheral jet cushion principle that purports to provide a relatively smooth ride, but apparently fails to furnish any inherent adjustment to centrifugal forces developed in a turn. U.S. Pat. No. 3,168,875 discloses a track air bearing and is conceptually different from a suspended vehicular system. U.S. Pat. No. 3,799,061 also discloses an elevated track or guideway for a transit system. Each of the aforementioned patents is herein incorporated by reference in their respective entireties.

The foregoing discussion is intended only to illustrate some of the shortcomings present in the field of the invention at the time, and should not be taken as a disavowal of claim scope.

SUMMARY

In accordance with various embodiments of the present invention, there is provided a suspended mass transit system. Various embodiments of the suspended mass transit system comprise a flexible concave elevated guideway that has at least one truck movably supported therein. At east one hanger is coupled to the at least one truck and a movable passenger vehicle. The hanger has a dynamic joint that is configured to permit adjustment of a vertical distance between the guideway and the passenger vehicle. The system further includes a propulsion system for propelling the movable passenger vehicle along the elevated guideway.

In alternative embodiments, the guideway may be a trough whose interior cross section is circular. The guideway may comprise a flexible structure and the passenger vehicle may incorporate dynamic leveling. A plurality of air cushion machines may be concentrically constructed to fit within the guideway. A vehicle support structure attached to the air cushion machines may extend upwardly out of the guide-way, and then arch over into a vertical disposition to support the passenger vehicle under the guideway. The concentric structure of the air cushion machines and guideway may permit the passenger vehicle to perform as a pendulum. Consequently the guideway does not have to resist torque loads and the passenger vehicle will always make coordinated turns.

In accordance with another embodiment of the present invention, there is provided a suspended mass transit system. In various embodiments, the mass transit system comprises a flexible concave elevated guideway that is formed from a plurality of pultruded segments that are attached in end-to-end fashion. The system includes at least one hanger that has an upper portion movably supported within the concave guideway. A movable passenger vehicle is coupled to a lower portion of the at least one hanger that extends vertically below the elevated guideway. The system further includes a propulsion system for propelling the movable passenger vehicle along the elevated guideway.

In accordance with yet another embodiment of the present invention, there is provided a suspended mass transit system. In various embodiments, the mass transit system comprises a flexible concave elevated guideway. The system further includes at least one hanger that has an upper portion thereof movably supported within the concave guideway. A plurality of driven wheels are operably supported in an arcuate array on the upper portion of the hanger. The wheels are in driving contact with a concave inner surface of the flexible concave elevated guideway. A passenger vehicle is coupled to a lower portion of the at least one hanger that extends vertically below the elevated guideway.

The guideway is a flexible structure and the passenger vehicle incorporates dynamic leveling. The concentric structure of the wheeled trucks and guideway permit the passenger vehicle to perform as a pendulum. Consequently the guideway does not have to resist torque loads and the passenger vehicle will always make coordinated turns. This embodiment may be particularly well-suited for lower speed applications.

Accordingly, various embodiments of the present invention provide solutions to many shortcomings associated with mass transit systems. Those of ordinary skill in the art will readily appreciate, however, that these and other details, features and advantages will become further apparent as the following detailed description of the embodiments proceeds.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 22 is a plan view of an intersection embodiment of the present invention;

FIG. 23 is a side elevational view of a bridge arrangement of various embodiments of the present invention;

FIG. 34 is a front view of a portion of a streamline vehicle and coupling arrangement of various embodiments of the present invention;

FIG. 35 is a partial side view of a portion of the coupling arrangement depicted in FIG. 34;

FIG. 36 is another side view of a portion of the coupling arrangement of FIGS. 34 and 35; and FIG. 37 is a partial cross-sectional view of the coupling arrangement taken along line 37-37 in FIG. 36.

DETAILED DESCRIPTION

Certain exemplary embodiments will now be described to provide an overall understanding of the principles of the structure, function, manufacture, and use of the systems and components disclosed herein. One or more examples of these embodiments are illustrated in the accompanying drawings. Those of ordinary skill in the art will understand that the systems and components specifically described herein and illustrated in the accompanying drawings are non-limiting exemplary embodiments and that the scope of the various embodiments of the present invention is defined solely by the claims.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment.

Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

Figure 1:
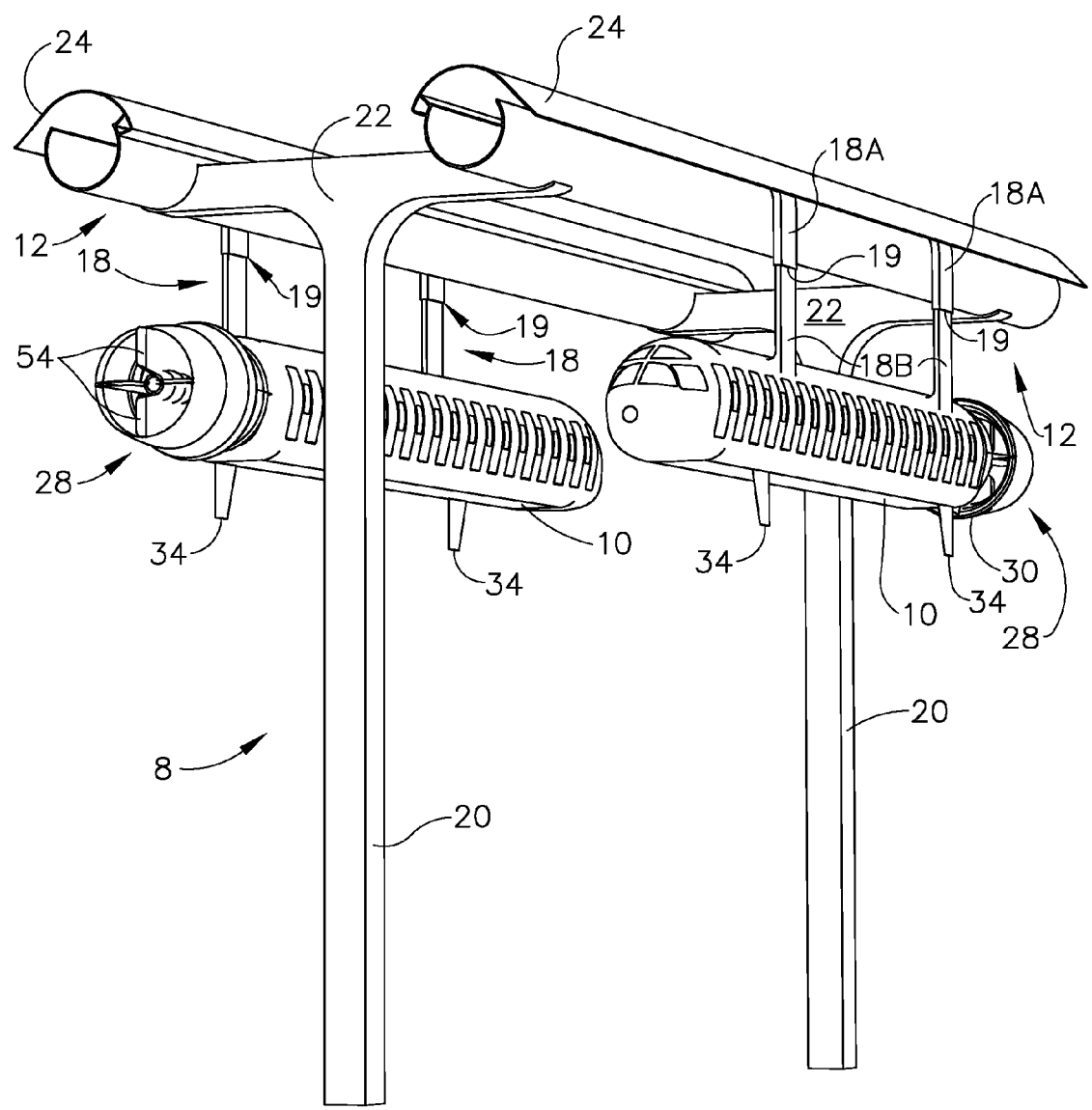
FIG. 1 is a perspective view of a portion of an embodiment of the mass transit system of the present invention.
Figure 2:
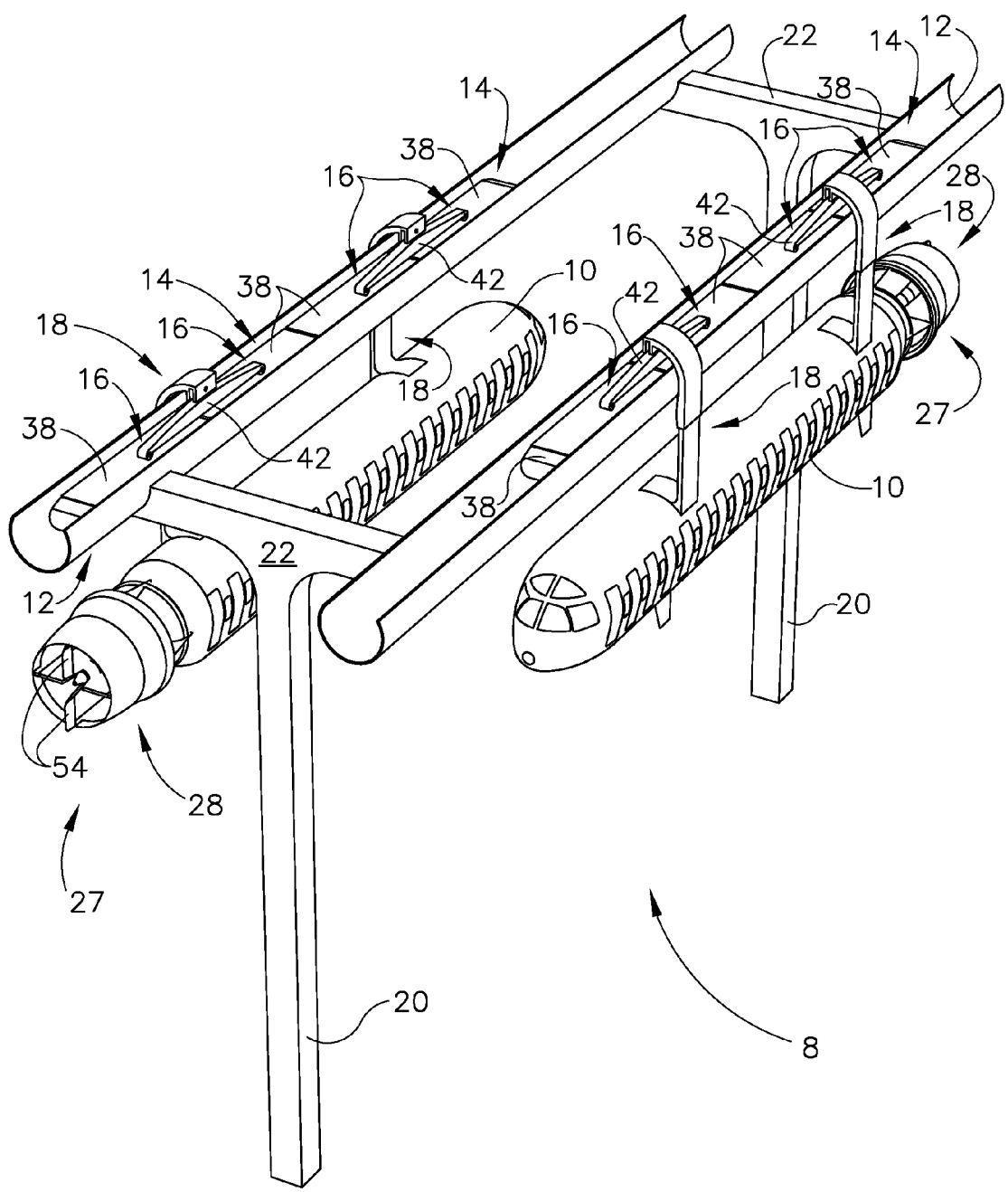
FIG. 2 is a top perspective view of the portion of mass transit system depicted in FIG. 1 with the cover removed for clarity.
Figure 3:
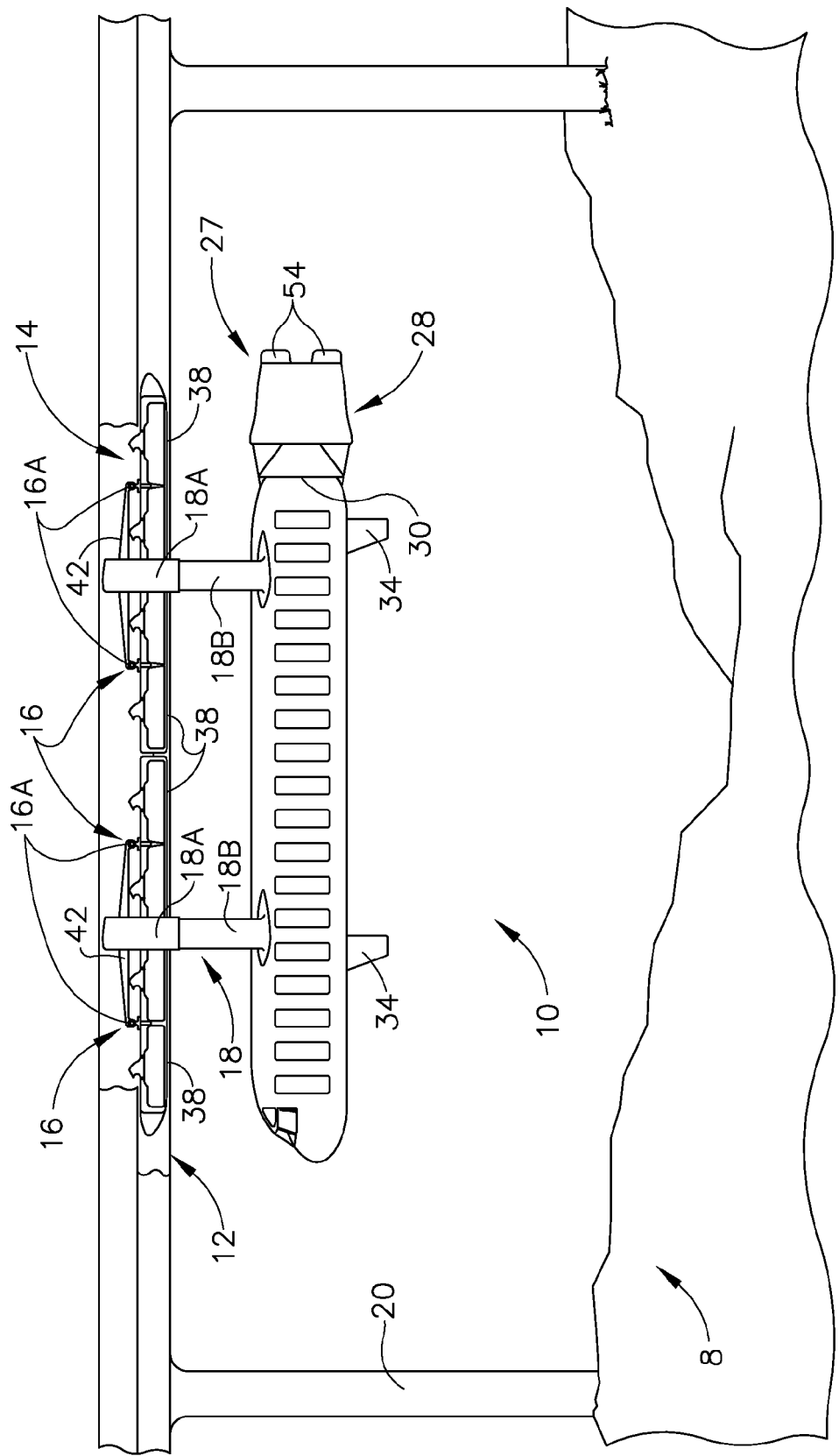
FIG. 3 is a side elevational view of a portion of an embodiment of the system of the present invention.
Figure 4:
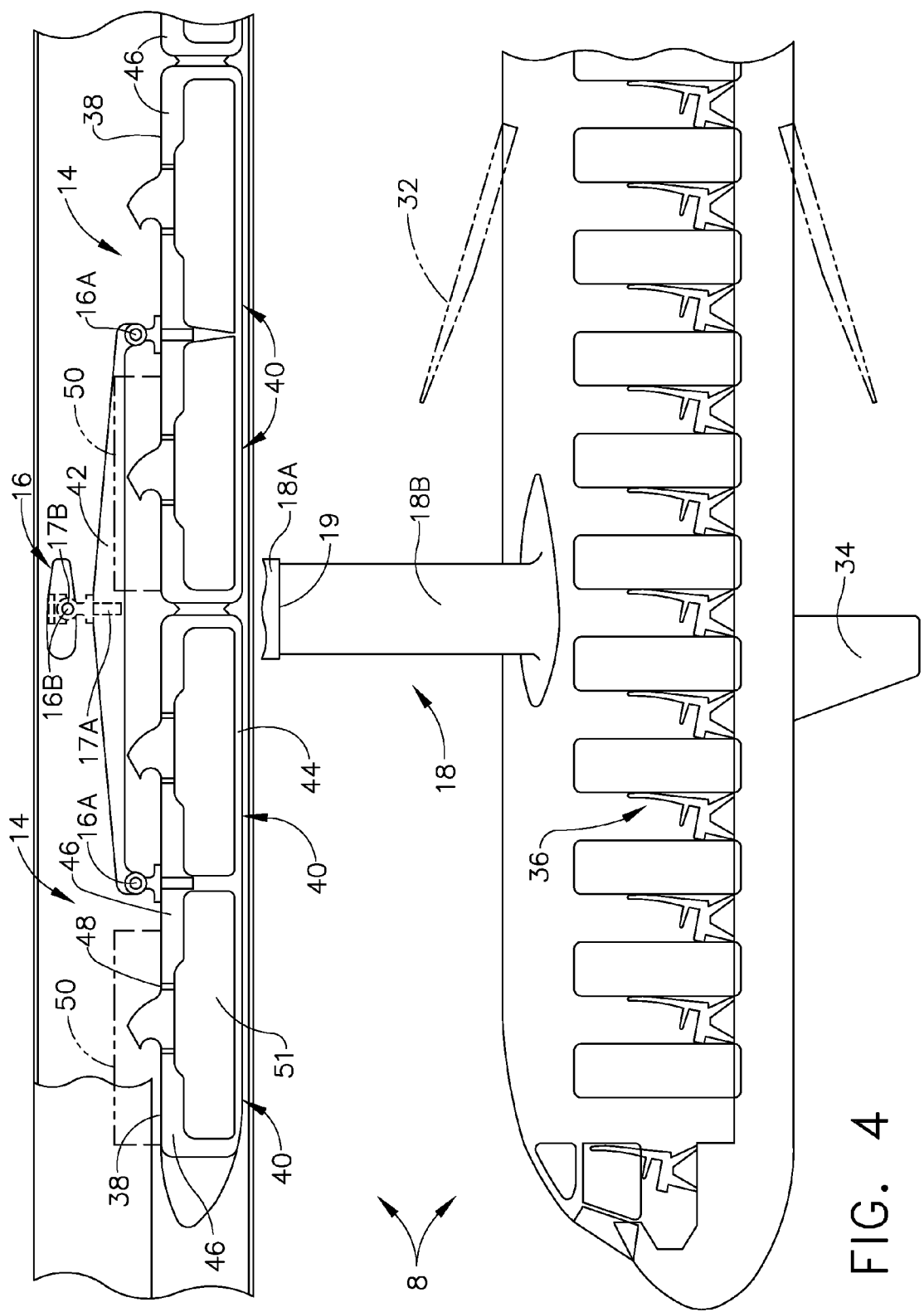
FIG. 4 is an enlarged view of a portion of the system depicted in FIG. 3.
Figure 5:
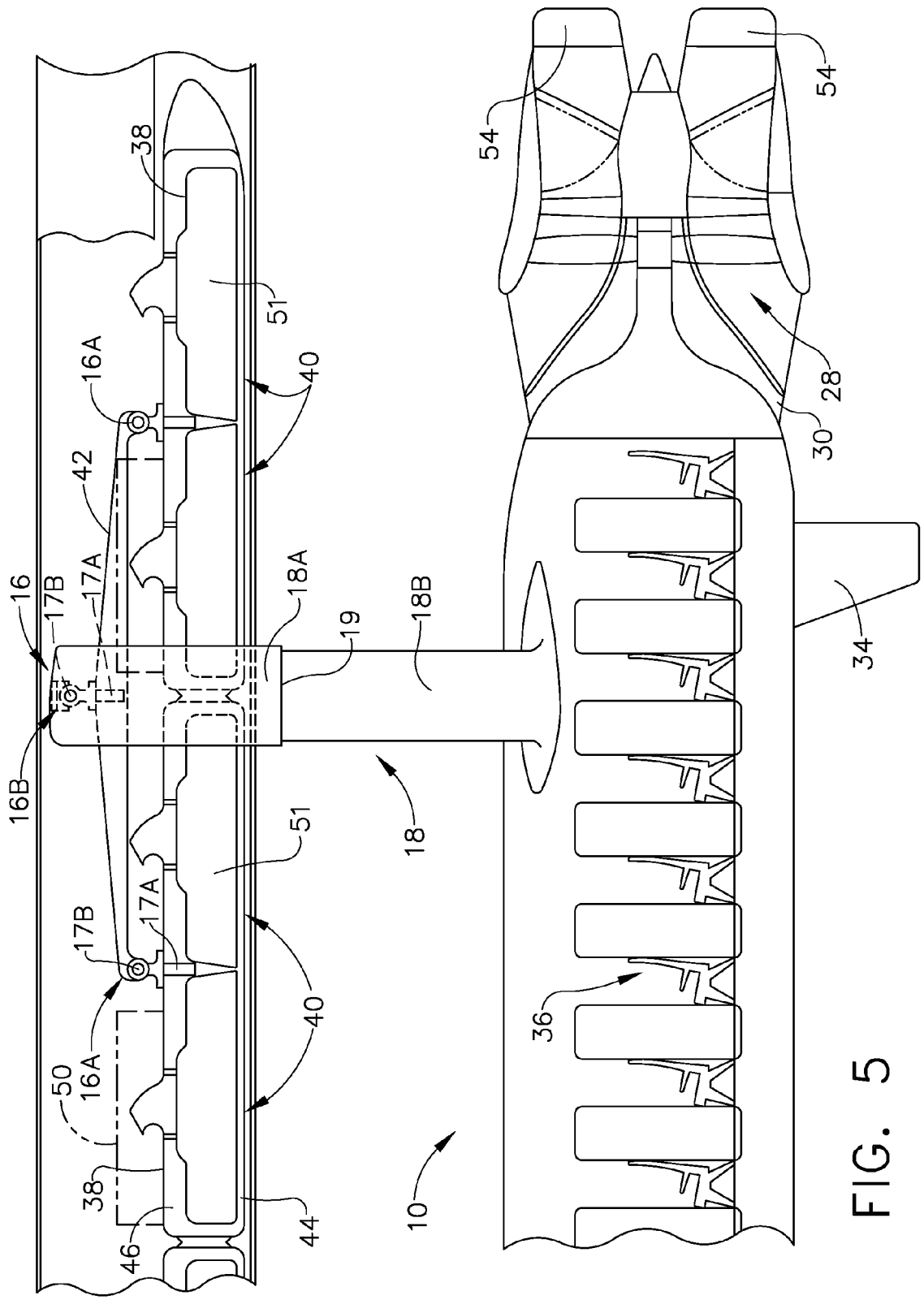
FIG. 5 is another enlarged view of another portion of the system depicted in FIG. 3.
Figure 6:
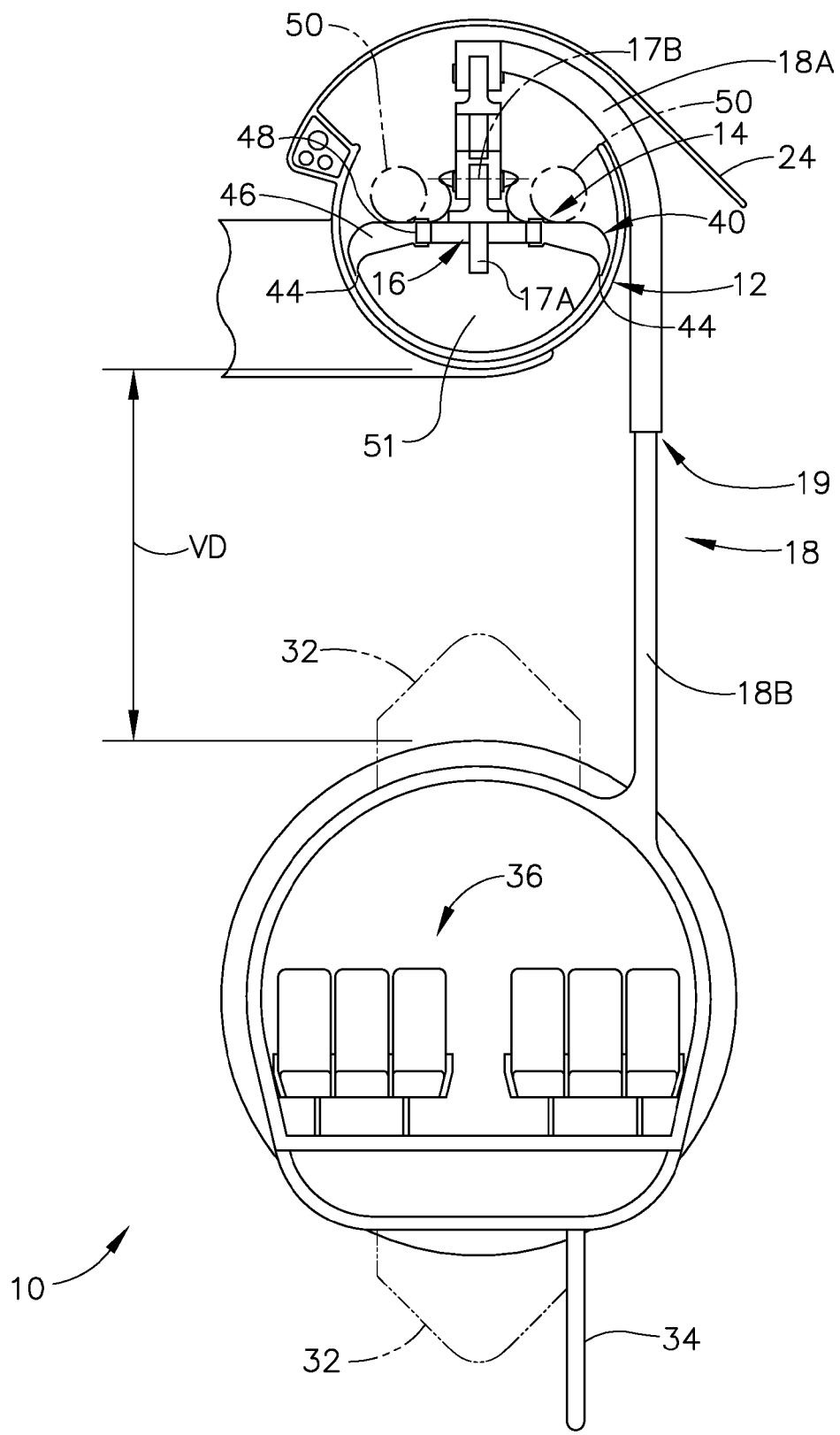
FIG. 6 is a cross-sectional view of a portion of the system depicted in FIGS. 1-5.

Referring now to the drawings for the purposes of illustrating embodiments of the invention only and not for the purpose of limiting the same, there is shown a mass transit system, generally designated as 8. A preferred embodiment of the mass transit system 8 is shown in FIGS. 1-6. As can be seen in those Figures, various embodiments include a streamlined vehicle 10 that is suspended from a substantially flexible concave elevated guideway 12 by a truck system 14 that is pivotally connected through bearings 16 to at least one, and preferably two, hangers 18. More specifically, the truck system 14 comprises at least one, and preferably four, truck assemblies 38 that in turn incorporate a pair of peripheral jet air cushion machines 40. Each truck assembly 38 is pivotally connected to the ends of a spanner beam 42 through bearings 16A. Each spanner beam 42 is pivotally attached to the upper end of hangers 18 through bearings 16B. In this manner, truck system 14 is free to pivot in the horizontal and vertical planes through bearings 16 in order to negotiate turns and changes in elevation. In various embodiments, bearings 16 comprise a vertical pivot 17A and a transverse pivot 17B as is shown in FIG. 6, thus providing two degrees of freedom.

Figure 7:
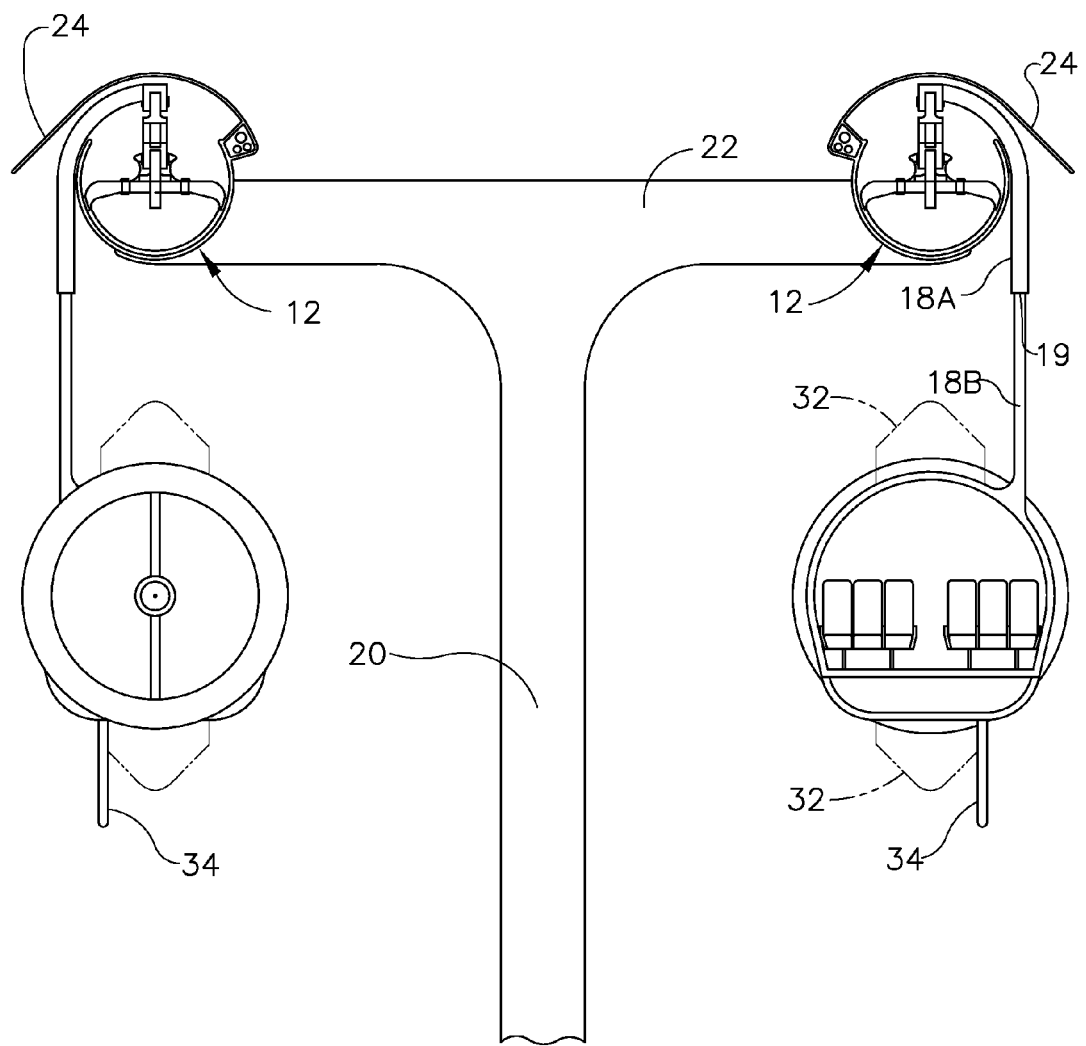
FIG. 7 is an end elevational view of a portion of an embodiment of a mass transit system of the present invention.
Figure 8:
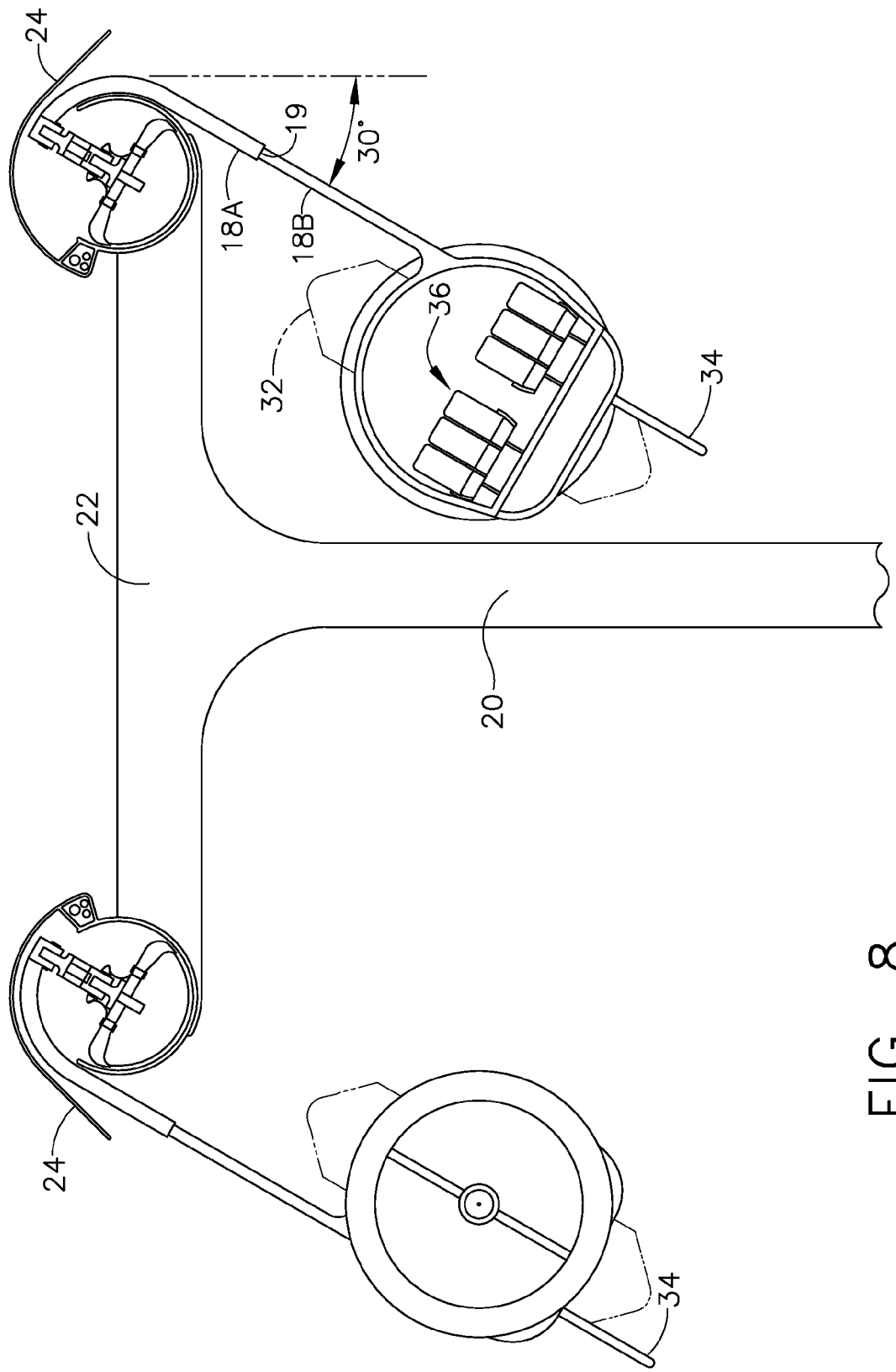
FIG. 8 is another end elevational view showing potential vehicle sway positions.

In various embodiments, hangers 18 in general have an inverted "J" shape. Note that in various embodiments, the lower portion of truck system 14 thereof is substantially concentric with guideway 12 as shown in FIG. 6. This arrangement may, for example, facilitate sway movement as large as plus or minus 30 degrees as is indicated in FIGS. 7 & 8. As is also shown, an upper portion 18A of hangers 18 may be sleeved over a lower portion 18B to form a dynamic joint 19. It will be understood that, as a streamlined vehicle 10 travels along guideway 12, the guideway will flex in a wave form induced by the passing load and may consequently produce a vertical acceleration in vehicle 10 if no compensation is provided. The dynamic joint 19 will provide the required compensation and prevent vertical accelerations of the streamlined vehicle 10. More specifically, as the guideway 12 flexes downward, the dynamic joint 19 will shorten and conversely, as the streamlined vehicle 10 passes over a pier where the guideway 12 will be at or near its high point, the dynamic joint 19 will lengthen hanger 18 to provide a level path for the streamlined vehicle 10. Thus, the dynamic joint 19 permits adjustment of a vertical distance "VD" (FIG. 6) between the guideway 12 and the passenger vehicle 10.

Figure 6A:
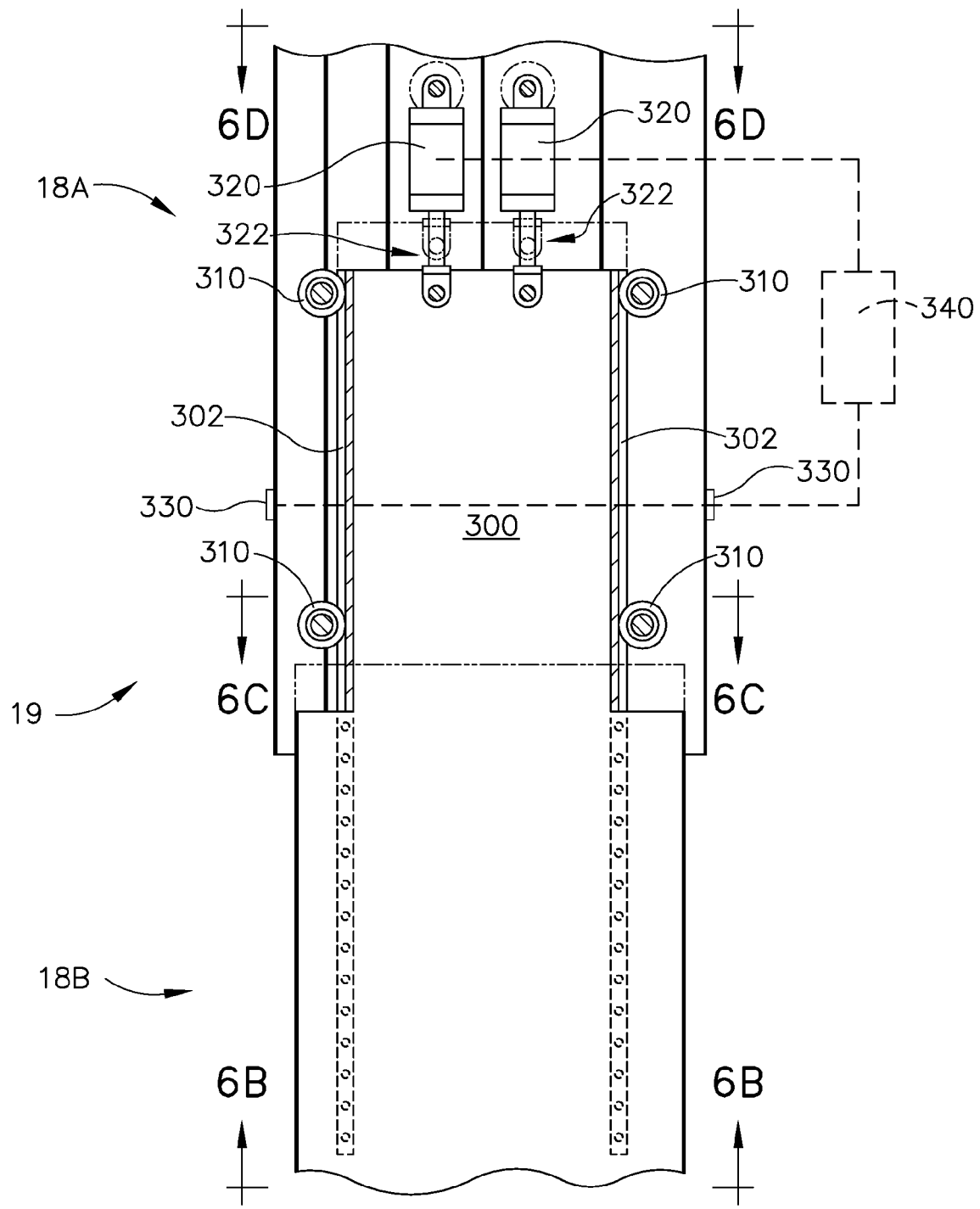
FIG. 6A is a partial cross-sectional elevational view of a portion of a dynamic joint embodiment of the present invention.
Figure 6B:
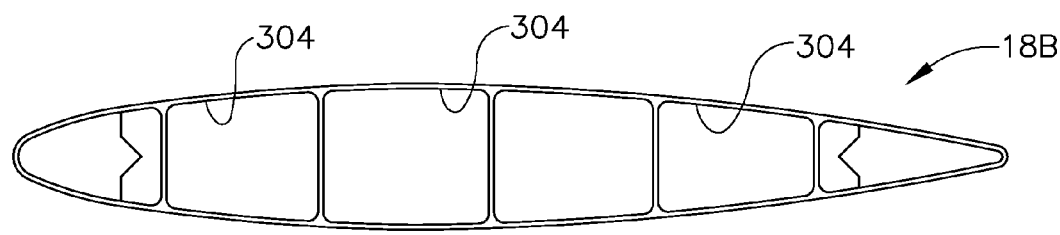
FIG. 6B is a cross-sectional view of the lower joint portion of the dynamic joint taken along line 6B-6B in FIG. 6A.
Figure 6C:
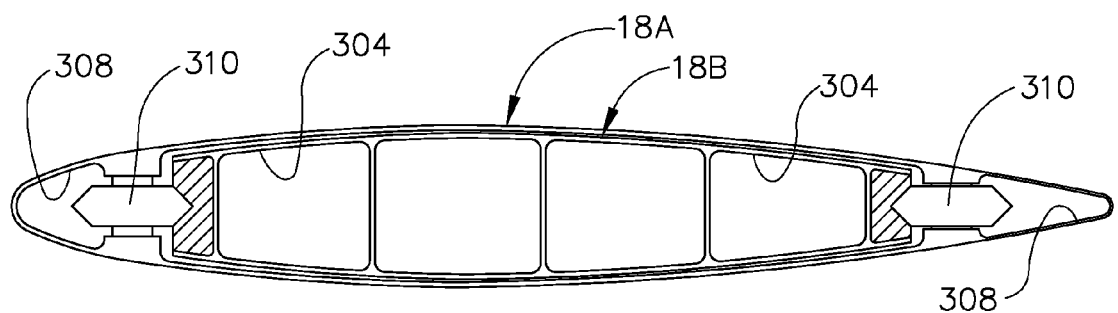
FIG. 6C is a cross-sectional view of the upper joint portion of the dynamic joint taken along line 6C-6C in FIG. 6B.
Figure 6D:
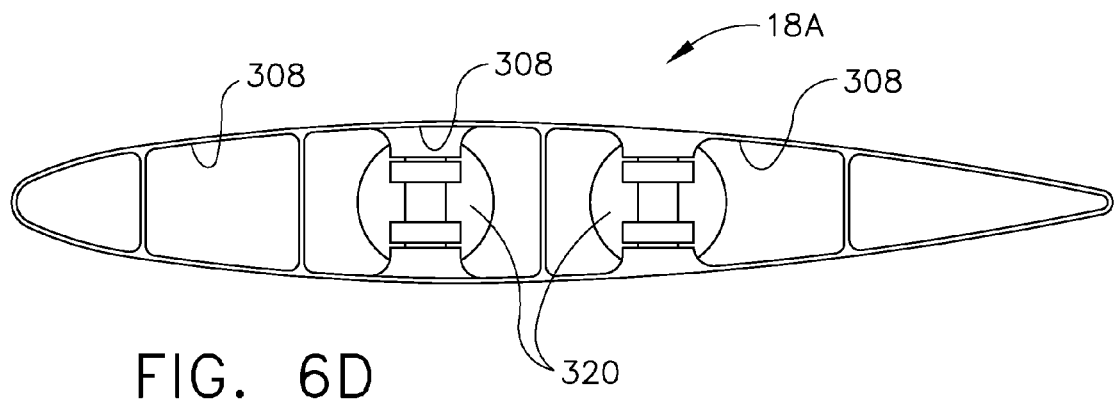
FIG. 6D is another cross-sectional view of the upper joint portion of the drynamic joint taken along line 6D-6D in FIG. 6A.

FIGS. 6A-D illustrate one embodiment of a dynamic joint 19 of the present invention. As can be seen in FIG. 6A, for example, the lower portion 18B of the dynamic joint 19 has an upper attachment portion 300 protruding thereon that has a pair of linear bearing rails 302 attached to each lateral side thereof. The lower portion 18B may be fabricated from, for example, metal and/or composite material and have a series of open cells 304 formed therein to reduce its weight. The upper attachment portion 300 may be fabricated from, for example, metal and/or composite material. The bearing rails 302 on the upper attachment portion 300 are movably received between a plurality of at least four roller bearings 310 that are attached to the upper portion 18A of the dynamic joint 19. The upper portion 18A of the dynamic joint 19 may be similarly fabricated from metal and/or composite material and have a series of open cells 308 formed therein to reduce its weight.

In various embodiments, at least one and preferably at least two hydraulic cylinders 320 are attached between the upper portion 18A and the lower portion 18B of the dynamic joint. Thus, when the pistons 322 are extended, the lower portion 18B will move linearly away from the upper portion 18A and as the pistons 322 are retracted, the lower portion 18B is linearly drawn toward the upper portion 18A. In one embodiment, one or more accelerometers 330 are employed to control the vertical travel of the lower portion 18B and communicate control data to a control system, generally represented as 340. Based on the input signals received from the accelerometer 330, the control system 340 will send appropriate control signals to the cylinders 320 such that the cylinders 320 are adjusted in such a manner as to maintain the streamline vehicle 10 in a substantially steady vertical state even as the elevated guideway 12 experiences differing degrees of flexing depending upon where the streamline vehicle 10 is located on the elevated guideway 12.

As can be seen in FIG. 6, the elevated guideway 12 may have a substantially concave shape. Each air cushion machine 40 may be concentrically shaped related to the elevated guideway. In various embodiments, each air cushion machine 40 may incorporate at least one peripheral nozzle 44 that is supplied with air from plenum chamber 46 that is in turn supplied with air from a fan 48. Fan 48 may be driven by a power means (e.g., motor or motors) located in area 50 as indicated by phantom lines in FIGS. 4-6. Such arrangement forms a concentric air cushion that serves to float the trucks 14 within the elevated guideway 12. In particular, the elevated guideway 12 has a concave inner surface and the air is blown out of the perimeter of the air cushion machine 40 into contact with the concentric inner surface of the guideway to float the air cushion machine 40 therein. Alternatively, power means may be located in volume 51 within each air cushion machine 40. Plenum chambers 46 may also be supplied with air from a propulsive turbofan engine 28 or compressor arrangement. Air bearing suspension may also prove applicable.

Figure 9:
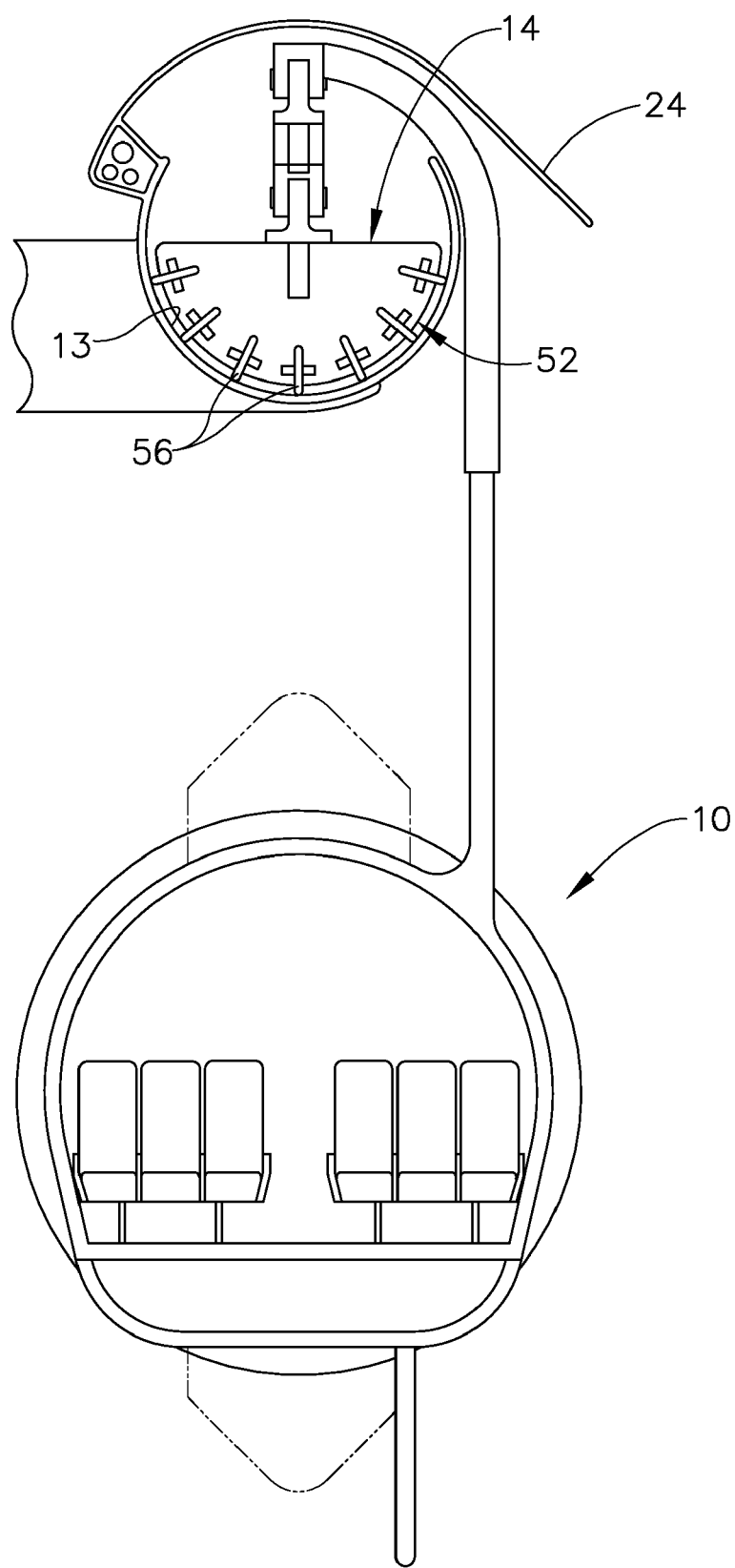
FIG. 9 is a cross-sectional end view of an alternative embodiment employing wheeled truck assemblies.

For low speed urban systems, wheeled truck assemblies 52 could be employed in a substantially concentric array such that they are in driving engagement with a concave inner surface of the concave guideway 12 as illustrated in FIG. 9. A plurality of small diameter wheels 56 would facilitate operation inside guideway 12. Each wheel 56 could also incorporate its own electric motor, the plurality of which would more than propel and stop a streamline vehicle 10. Consequently a "clean" (no air propulsion) low speed urban vehicle can use the same guideway system as a faster interurban vehicle.

As shown, in various embodiments, the air cushion support system is a plurality of air cushion machines 40 that are coupled to each other in a specific manner. The hinges that connect the trucks 14 to the spanner beam 42 employ pins that provide a specific degree of freedom so the air cushion machines 40 do not "flop" from one side or the other. In addition, in various embodiments, the air cushion machines 40 are connected in pairs with a sizeable vertical pin. Further, the pairs will be flexibly connected to each other to induce a "training" effect. In many embodiments, for example, the assembly is uniquely arranged so it can negotiate turns with reasonable radii of curvature, calculated in the order of four hundred and fifty feet (a 300 yard diameter circle) with a hover height of some three inches. In these embodiments, for example, a three hundred yard diameter parking lot at the end of the line provides a natural turnaround.

In some embodiments, the stand alone air cushion machines will take off when their forward velocity exceeds a critical value, much like a hydroplane race boat takes off when the wind gets under the front end. However, in various embodiments, this tendency is nullified by training the trucks, which lowers the width to length ratio substantially.

In various embodiments, the guideway 12 is supported by pillars 20 as is shown in FIGS. 1, 2, 7 and 8, which in turn holds a horizontal member 22. Guideway 12 and the cover 24 can be constructed from metals, composites or a combination of both. In some embodiments, the cover 24 may be integrally formed with the guideway 12 and in other embodiments, the cover 24 may be attached thereto by screws, bolts, fasteners, welds, adhesives, etc. The extended edge of the cover 24 overlaps the upper portion of guideway 12 to provide a substantially all weather system designed to prevent ice, snow, sand, leaves or other debris from collecting in guideway 12. Rare weather conditions may circulate some debris in the guideway 12. Such debris can be removed with a cleaning vehicle which could also be an integral part of each streamline vehicle 10.

Various embodiments of the streamlined vehicle 10 may be composed of aircraft-type structural parts and exhibit the general shape as indicated in the drawings. Each streamlined vehicle 10 is provided with a propulsion system 27. For example, in one embodiment, the propulsion system comprises a small propulsive turbofan engine 28 that is cantilever mounted at the aft end of the streamlined vehicle 10 as is best shown in FIG. 5. Engine core air may be drawn through annular inlet 30 formed about the circumference of the streamlined vehicle 10 just upstream of the turbofan engine 28, thus providing removal of boundary layer air for a reduction in skin friction drag. Porous panels could be substituted for annular inlet 30. The turbofan engine 28 may be configured to provide reverse thrust. Turbofan engine 28 is exemplary. For example, propulsion could also be provided by a turboprop engine using reverse pitch thrust. Electrically driven propulsion means may likewise be applicable.

Two fundamental approaches can include electric motors and drive wheels arranged in a concentric array for driving contact with a concave inner surface 13 of the concave guideway 12 in conjunction with the air cushion or air bearing suspension. See FIG. 9. Liner motor arrangements in conjunction with the air cushion or air bearing suspension are employed in other embodiments. The streamlined vehicle 10 may also be equipped with air brakes 32 (FIGS. 6 & 8) for use at high speeds. Ventral fins 34 may be provided as sway dampers and can be controlled automatically by, for example, a dynamic control system used to control cylinders, motors, etc. attached to the fins 34. The vertical fins 34 used for sway damping may be sufficient for controlling a certain amount of crosswind. Total crosswind control may require an additional system such as vectored fan thrust which can be provided by a rudder or rudders 54. See FIGS. 1-3.

Aerodynamically, the streamlined vehicle 10 of various embodiments can be likened to an aircraft fuselage. Its cross-section is shown in FIG. 6 as mostly circular, but it may be more appropriate to employ an ellipse, oval or some variance therebetween to minimize the effects of crosswind. Aircraft fuselages are designed to be pressure vessels, which is an unnecessary constraint with respect to streamline vehicle 10.

In various embodiments, the interior layout of the streamlined vehicle 10 may, for example, resemble that of a bus. Seats 36 and cabin interior may be arranged according to its purpose. Every seat row may have its own doors. One side of the vehicle may be used for ingress and the opposite side for egress. Individual doors may be combined into a single overhead door on each side of the cabin. Each seat row may have its own baggage compartment located in laterally disposed trays in the bottom of the vehicle. Baggage may be deposited by the passenger on the way in and picked up on the way out. Security concerns may be addressed before passengers approach the boarding area. Various embodiments may accommodate, for example, from 40, 60, 80, 100 passengers/vehicle. Still other embodiments may employ passenger vehicles that accommodate from one to a few people.

Figure 14:
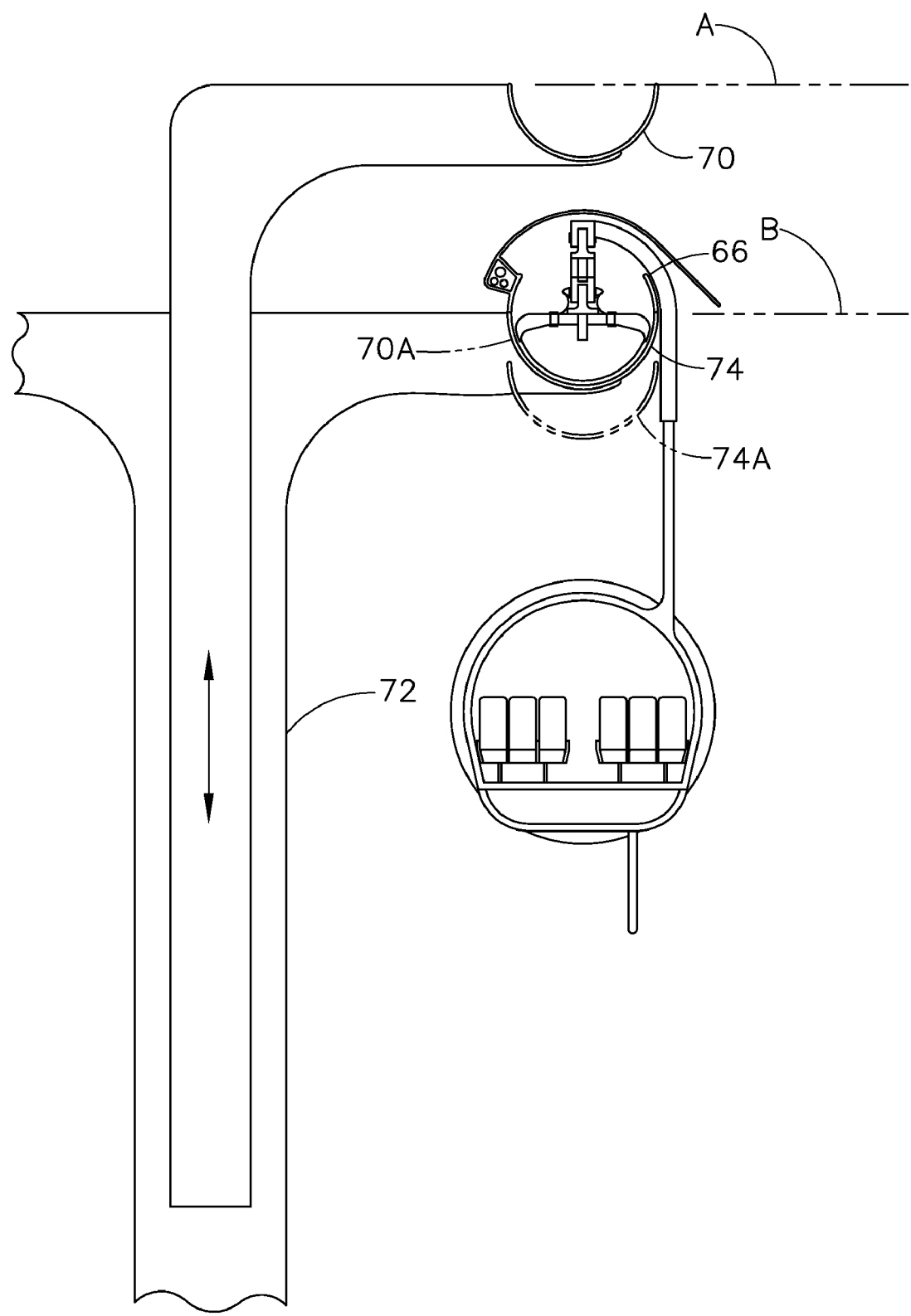
FIG. 14 is an end cross-sectional view of a switch embodiment of the present invention taken along line 14-14 in FIG. 10.

Various embodiments of the present invention also incorporate an appropriate and simple high-speed guideway switching mechanism. A switch 64 of an embodiment of the present invention is shown in plan view in FIG. 10 and in side elevation view in FIG. 11. A streamlined vehicle 10 is shown traversing switch 64 at the right side of the Figures. In various embodiments, the switch 64 includes a primary guideway 66, a secondary guideway 68, a switch rail 70 and a transition member 74. As can be seen at the right side of FIGS. 10 and 11, guideway 66 may terminate at section 14-14 (FIG. 14). The right extremity of transition member 74 may lie in substantial longitudinal alignment with the primary guideway 66 when the main guideway 66 is to be used. If the streamline vehicle 10 is to transfer to the secondary guideway 68, then transition member 74 will move downward to a phantom position 74A as shown in FIG. 14, and switch rail 70 will also move downward into substantial longitudinal alignment with primary guideway 66 and secondary guideway 68 as shown by phantom position 70A. Note that the cross-section of transition member 74 is abbreviated (the cover and upwardly extending sides are omitted for flexibility). The cross-section of switch rail 70 can also be abbreviated (FIG. 14) or full since this member is not required to flex.

Figure 10:
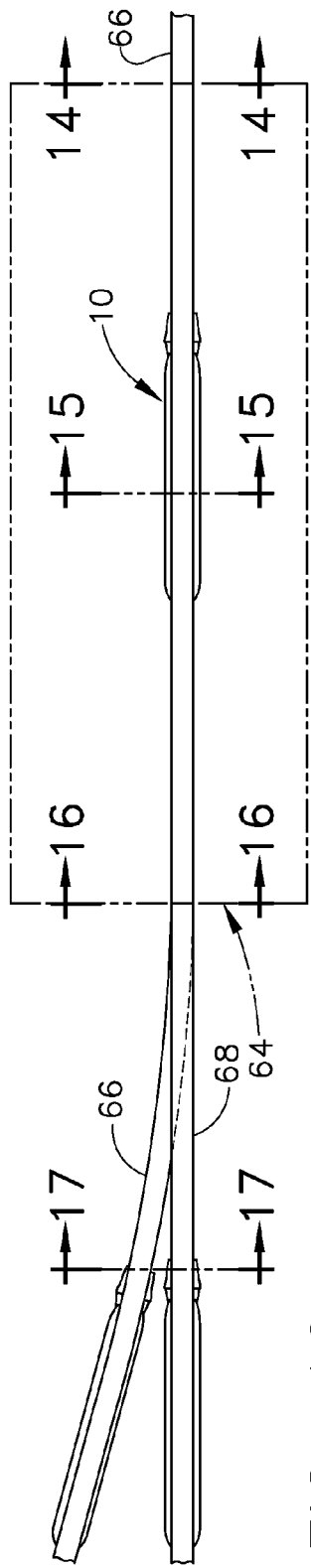
FIG. 10 is a plan view of a switch embodiment of the present invention.
Figure 11:
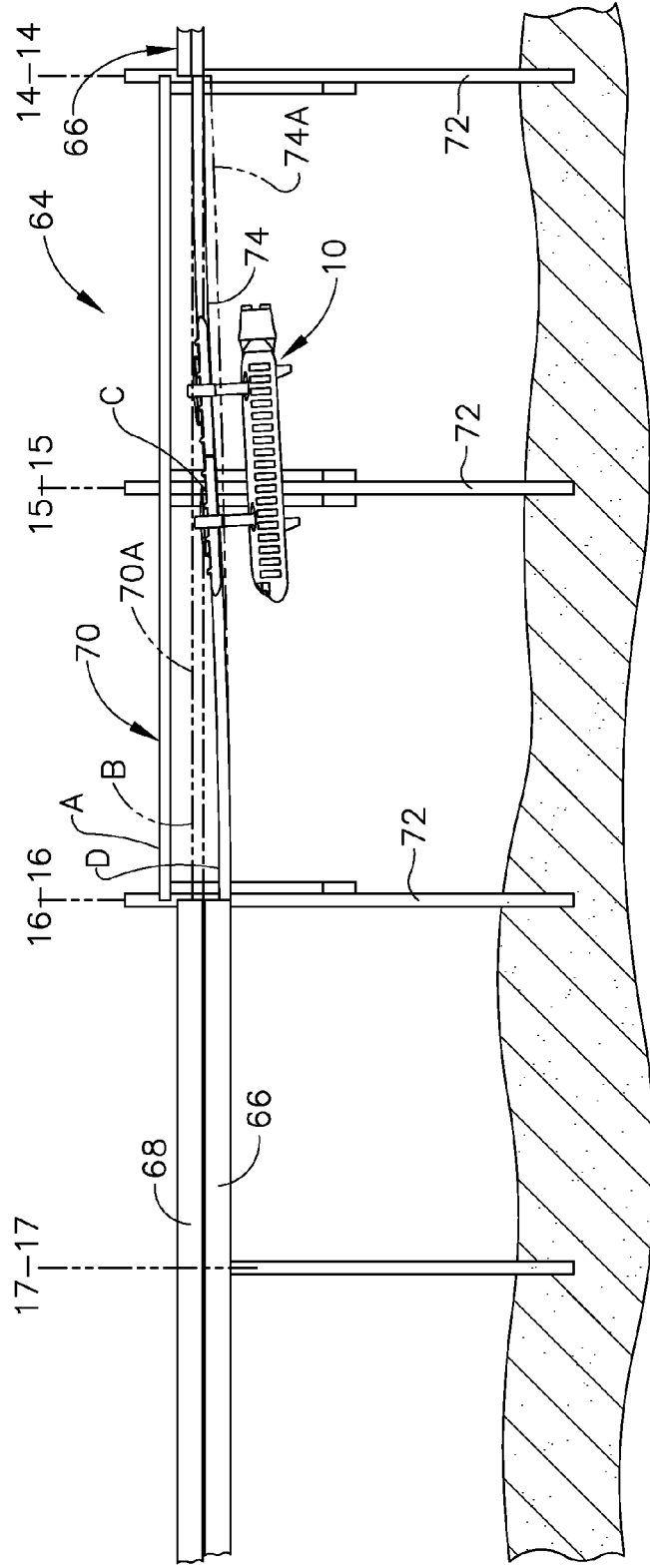
FIG. 11 is a side elevational view of the switch embodiment of FIG. 10.
Figure 12:
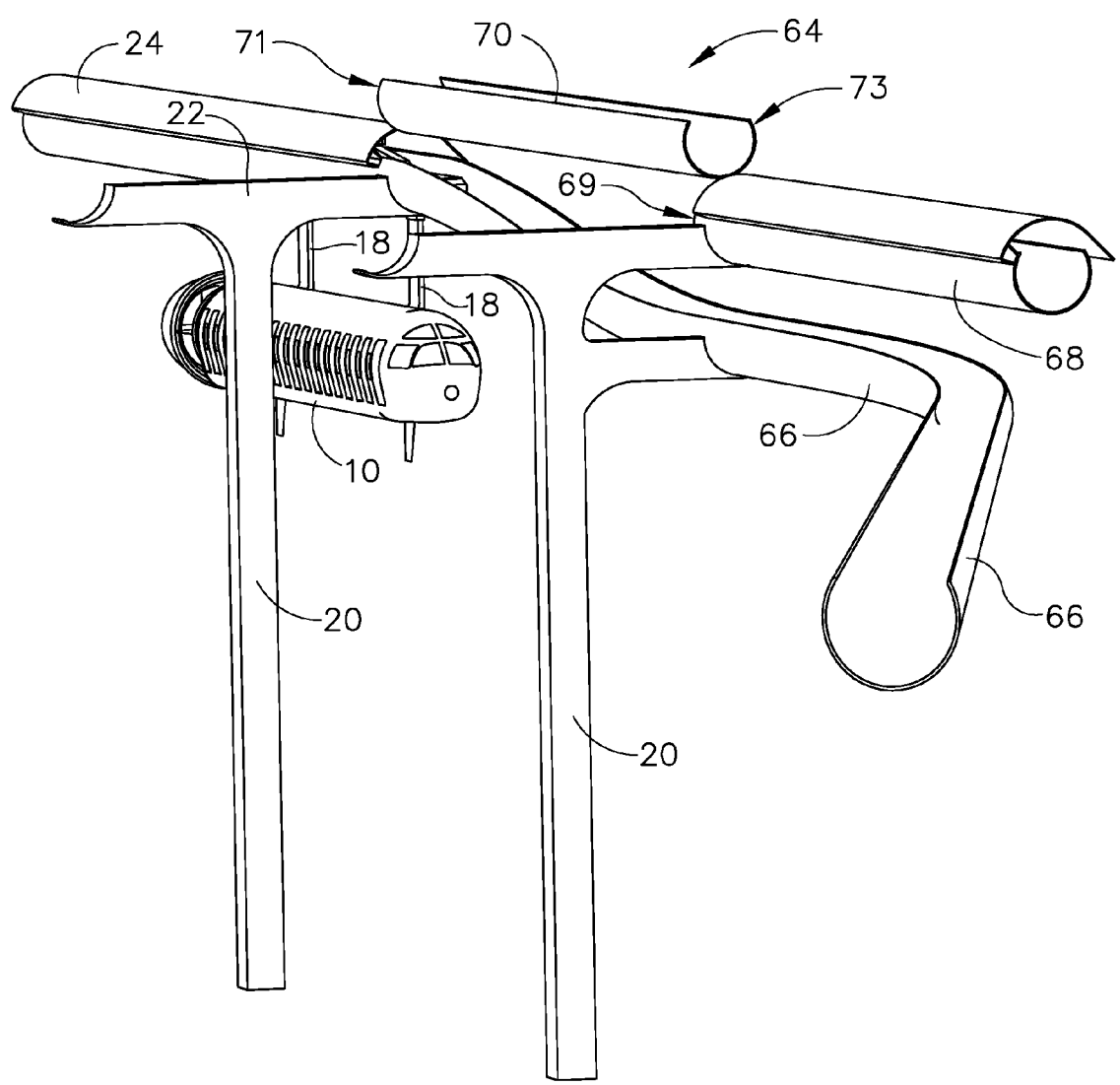
FIG. 12 is a perspective view of a switch arrangement of various embodiments of the present invention with the streamlined vehicle on the primary guideway portion.
Figure 13:
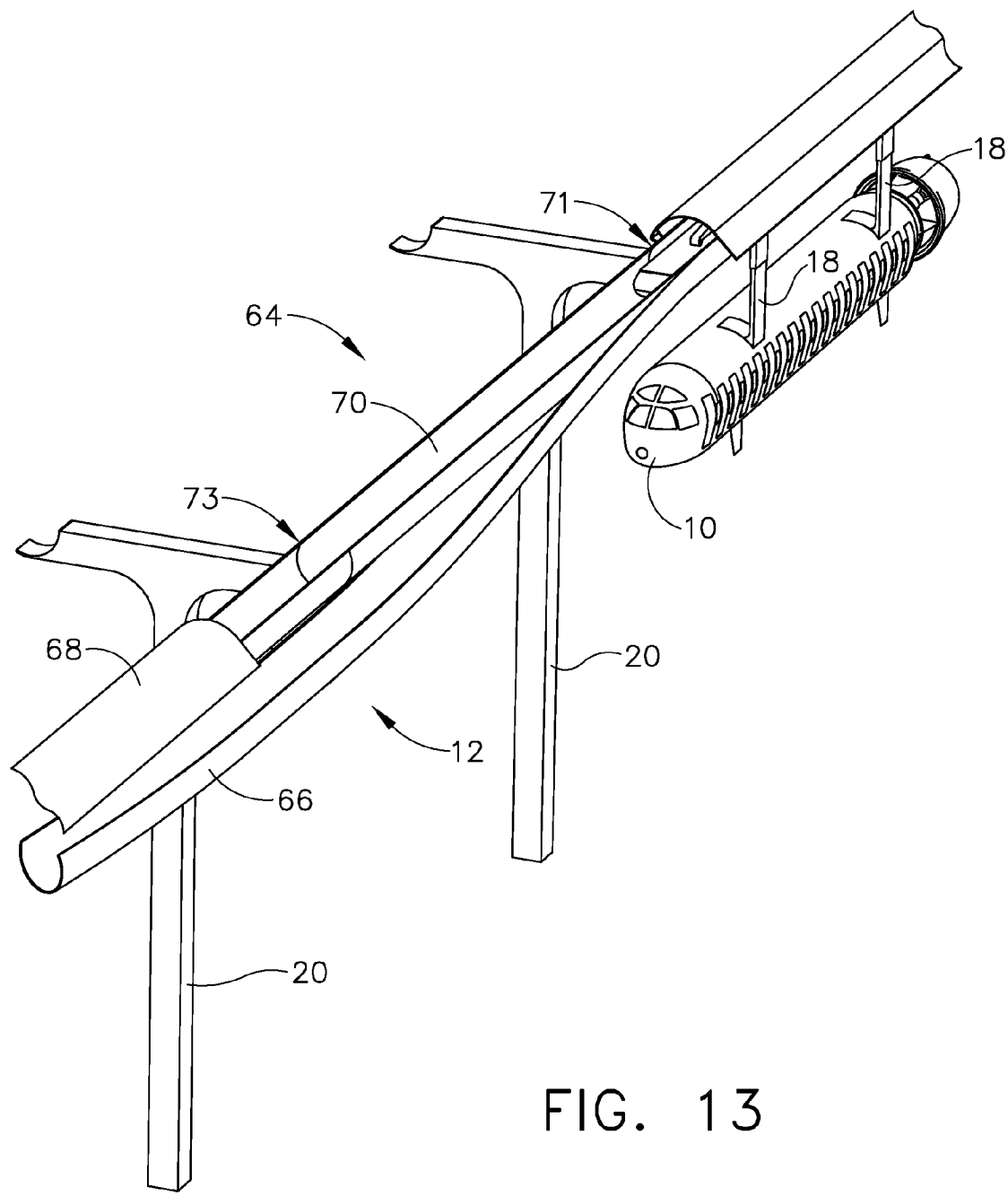
FIG. 13 is another perspective view of a switch arrangement of the present invention with the truck portion beginning to enter the switch rail.
Figure 15:
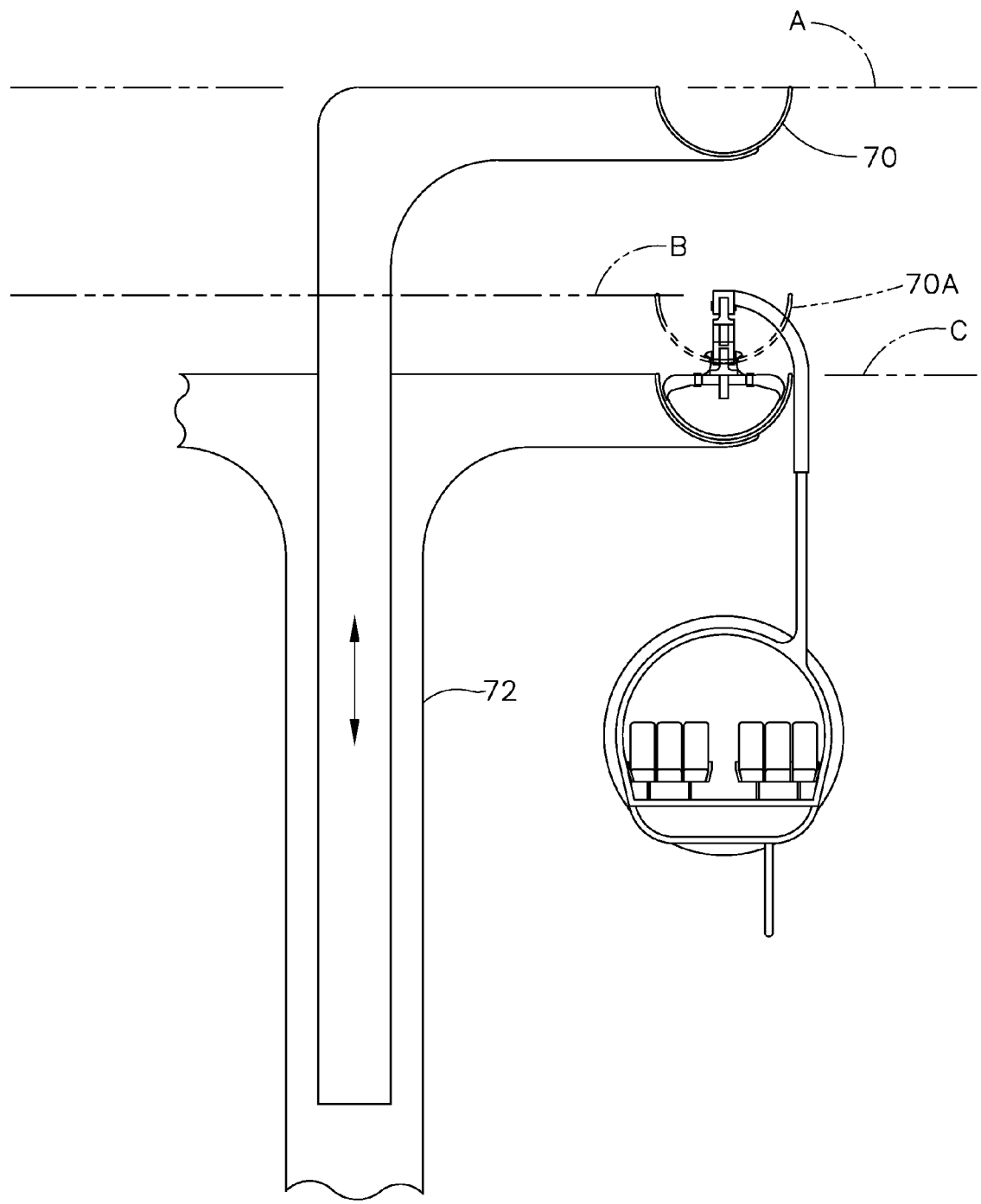
FIG. 15 is another cross-sectional view of another portion of an elevated guideway embodiment of the present invention taken along line 15-15 in FIG. 10.
Figure 16:
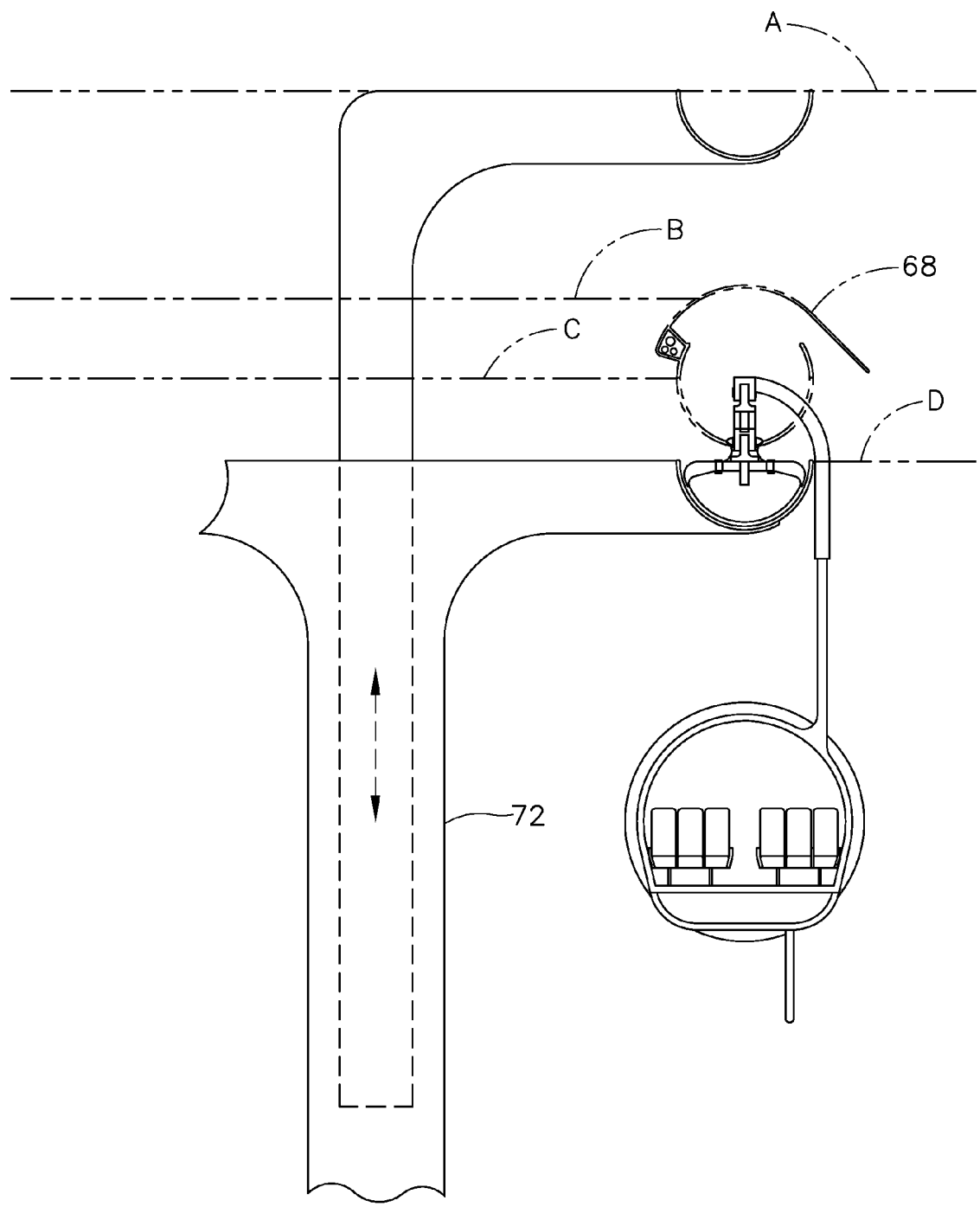
FIG. 16 is another cross-sectional view of another portion of an elevated guideway embodiment of the present invention taken along line 16-16 in FIG. 10.
Figure 17:
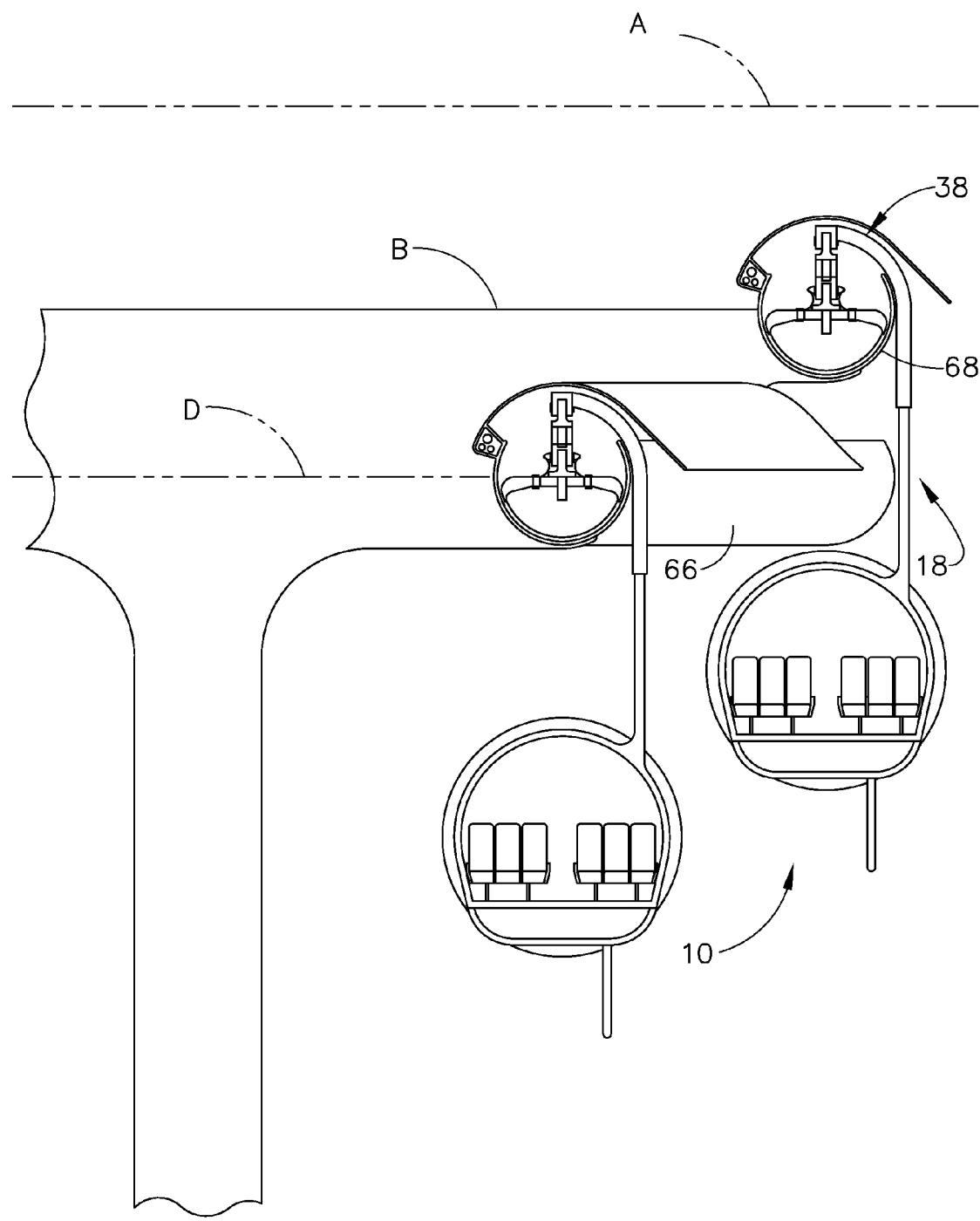
FIG. 17 is another cross-sectional view of another portion of an elevated guideway embodiment of the present invention taken along line 17-17 in FIG. 10.
Figure 18:
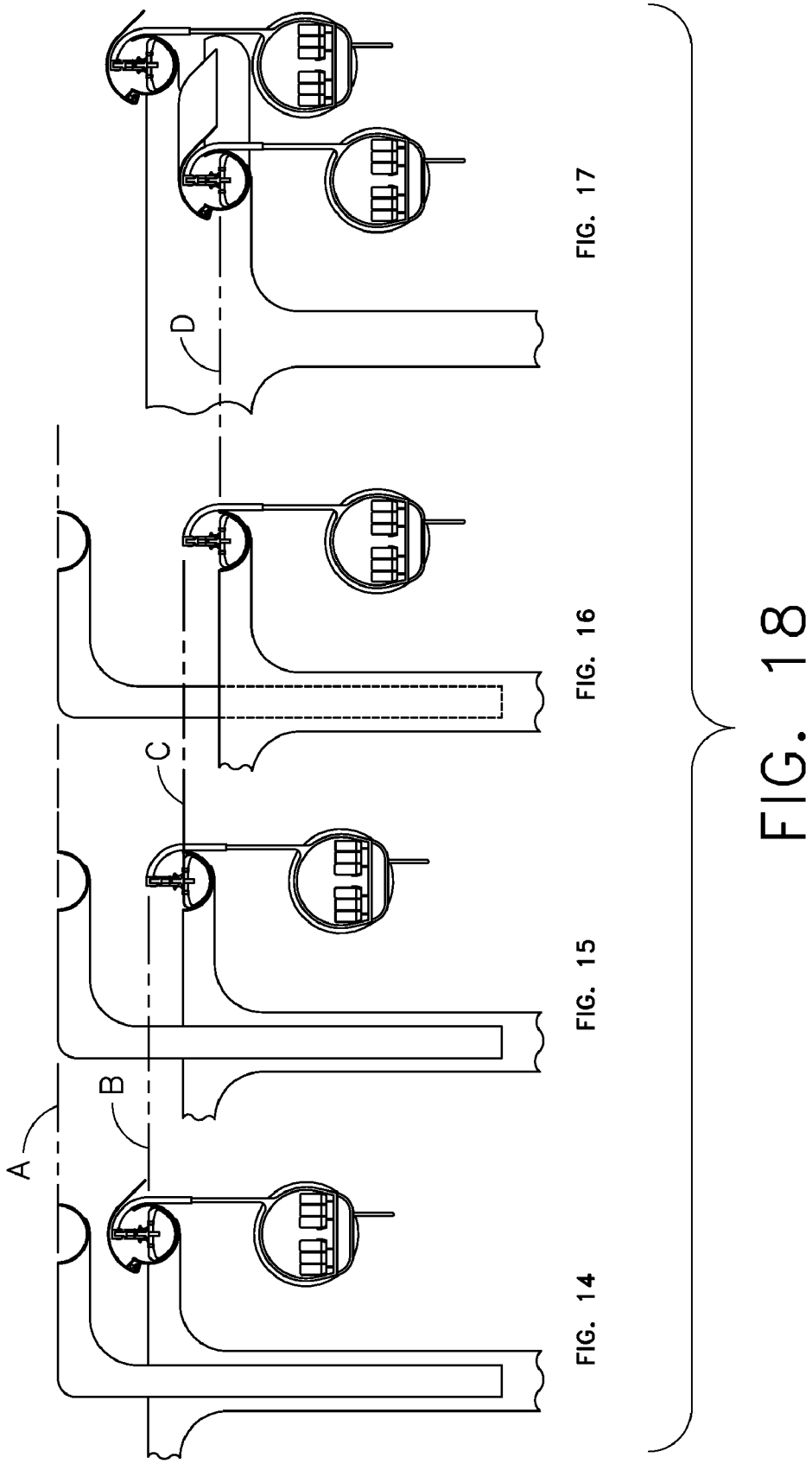
FIG. 18 illustrates a switching sequence of various switch embodiments of the present invention.

Moving to the left in FIGS. 10 and 11, transition member 74 initiates a gentle decline at Section 14-14 (FIG. 14), crosses a null point at Section 15-15 (FIG. 15) and terminates its decline at Section 16-16 (FIG. 16) having descended slightly more than one guideway diameter below its starting position. In the FIGS. 14-16, the switch rail 70 is stored at a level A, primary guideway 66 enters the switch 64 at a level B, passes the null point at a level C and exits the switch at a level D. From Sections 16-16 to 17-17 in FIGS. 10 and 11, the primary guideway 66 executes a gentle lateral turn to the right and subsequently leaves the vicinity of the switch 64. The secondary guideway 68 begins at section 16-16 and, if necessary begins an elevation adjustment to whatever is required at that particular location. The left extremity of transition member 74 is fixedly or rigidly attached to the primary guideway 66 as it leaves the switch 64. Alternatively the switch rail 70 can be designed to be substantially concentric in cross-section with the primary and secondary guideways so that the ends of switch rail 70 will be placed inside an overlapping portion of both the primary and secondary guideways 66, 68. In this manner, the continuity of the primary guideway 66 will be maintained. FIG. 17-17 clearly shows that the primary guideway 66 is lowered sufficiently to permit the initiation of the right hand turn. This will permit hangers 18 of streamlined vehicle 10 to be of minimum length to permit the top of streamline vehicle 10 to clear the bottom of primary guideway 66 when truck system 14 is riding in switch rail 70 or secondary guideway 68. At Section 17-17 (FIG. 17) primary guideway 66 has now been laterally displaced to the right sufficiently to insure that streamline vehicle 10 has clearance if it is necessary for secondary guideway 68 to incline. In various embodiments, the open position 72 for the switch rail 70 must be elevated enough to permit passage of the truck assembly 38 when the primary guideway 66 is in use. Switch rail 70 is raised into open position 72 by appropriate jacks, cylinders, winch arrangements, etc. installed on switch pillars 72 in the vicinity of the switch 64. The switch 64 will be under roof to insure all weather operation. See FIG. 11.

Figure 19:
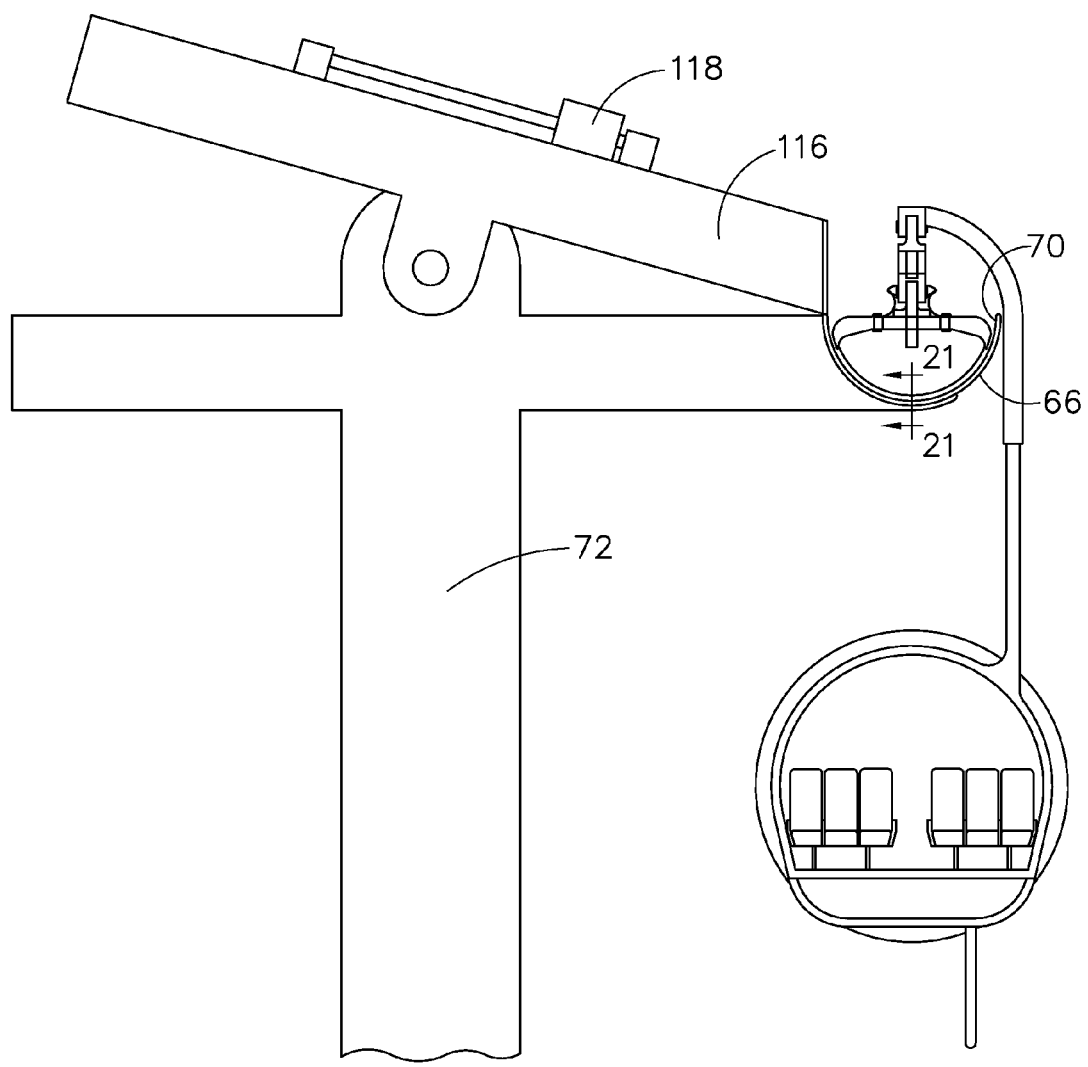
FIG. 19 is a partial cross-sectional view of another switch embodiment of the present invention with the switch rail thereof in a down position in concentric alignment with a primary guideway portion.
Figure 20:
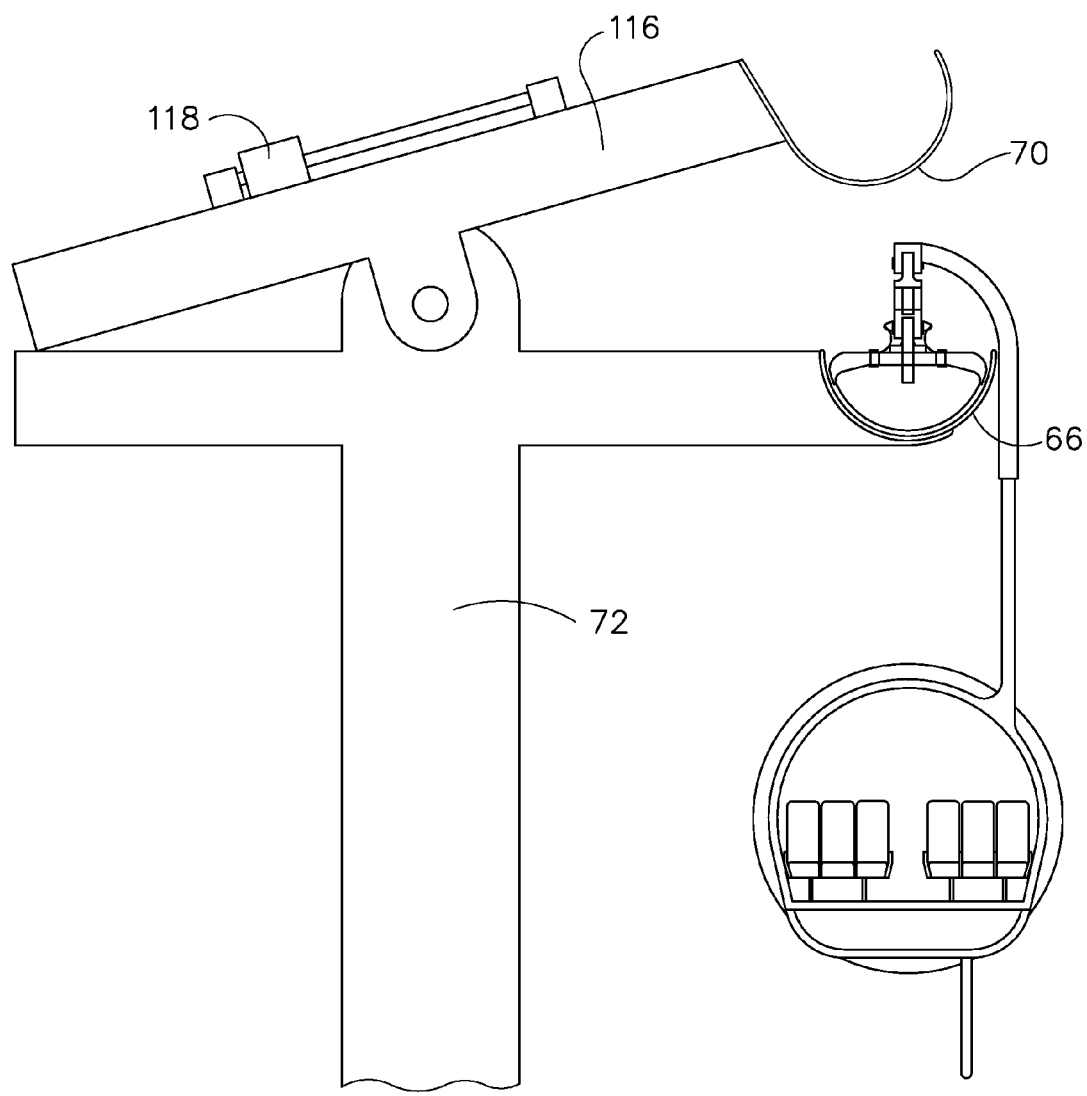
FIG. 20 is another partial cross-sectional view of the switch embodiment of FIG. 19 with the switch rail thereof in an up position.

An alternate method of manipulating the switch rail 70 is shown in FIGS. 19 and 20. In this embodiment, the switch rail 70 is mounted on balance beams 116 that are in turn pivotally mounted atop switch pillars 72. Balance weights 118 are driven from one side of the balance beams to the other to cause the switch rail 70 to fall into union with primary guide rail 66 and secondary guide rail 68 (FIG. 19), or raised completely out of union therewith when balance weights 118 are driven to the opposite end of their tracks (FIG. 20). In this manner it is unlikely that the switch rail 70 will ever reside at an intermediate position.

Figure 21:
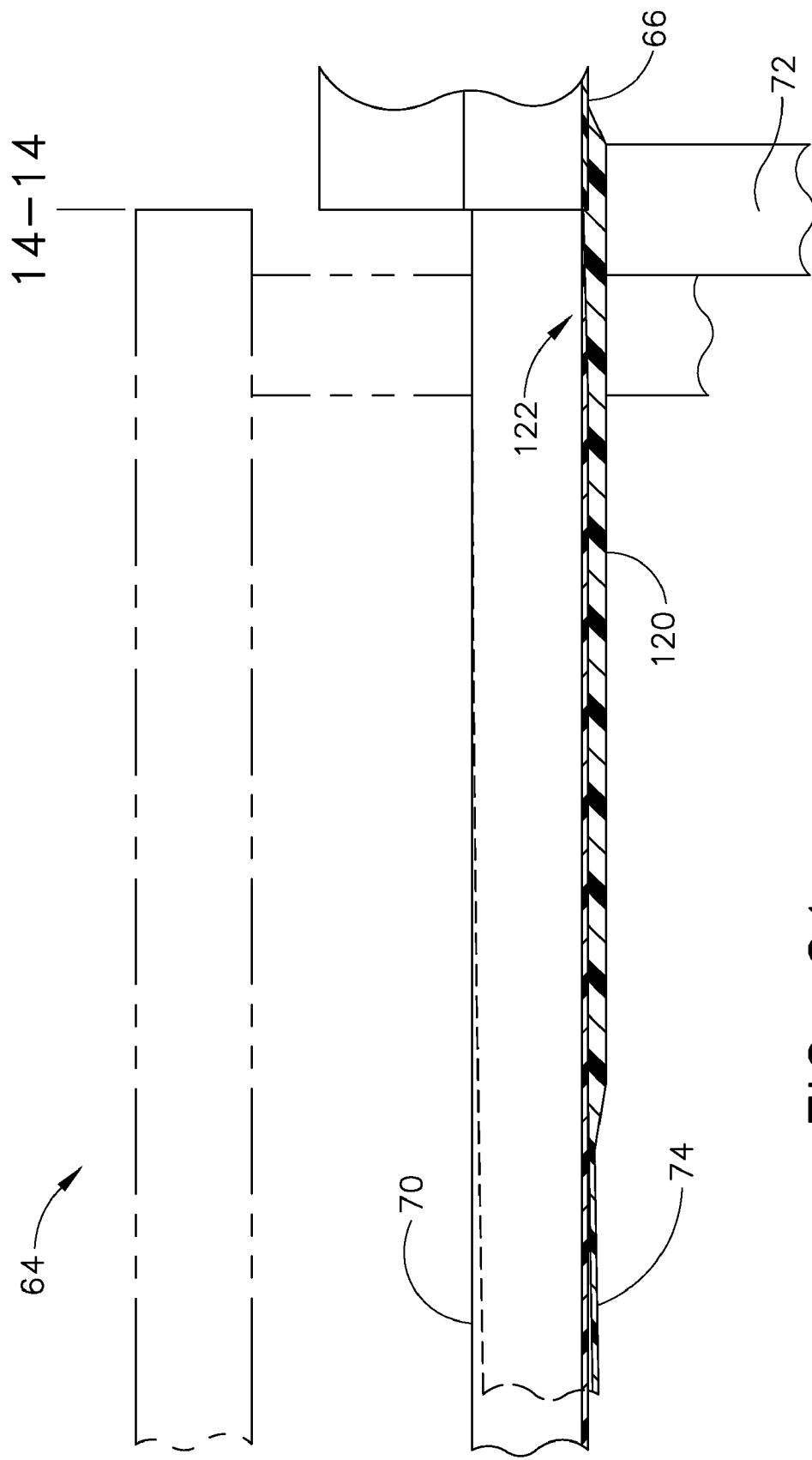
FIG. 21 is another cross-sectional view of the switch embodiment of FIGS. 19 and 20 taken along line 21-21 in FIG. 19.

FIG. 21 illustrates one approach to the union between the primary guideway 66 and the switch rail 70. As previously described, the primary guideway 66 enters the switch 64 at Section 14-14 as is shown in FIGS. 10, 11 and 14 and rests upon and is fixedly attached to the inlet end of a transition support 120. The transition support 120 can be separate from or integral with the inlet end of the transition member 74. The transition support 120 is substantially concentrically aligned with transition member 74 and provides enough material thickness so the inlet end of the switch rail 70 can incorporate a tapered end 122.

Various embodiments of this high speed transportation system of the present invention envisions two-way operation supported on "T" shaped pillars as shown in FIGS. 1, 2, 7 and 8. As is shown in FIG. 22, an intersection 80 may consist of two switches 64A and 64 B. The intersection 80 may incorporate departing primary guideway 66A, returning primary guideway 66B, departing alternate guideway 68A and returning alternate guideway 68B. A departing vehicle 82 is shown traversing switch 64A at position 86A and again along the primary guideway 66A at position 86B. Departing vehicle 82 is also shown at position 86C on alternate guideway 68A at the left side of the Figure. A returning vehicle 84 is shown in the upper left of FIG. 22 on the returning primary guideway 66B at position 88A and again at position 88B traversing switch 64B. The returning vehicle 84 is also shown at position 88C on the returning secondary guideway 68B also shown on the left side of FIG. 22.

Figure 24:
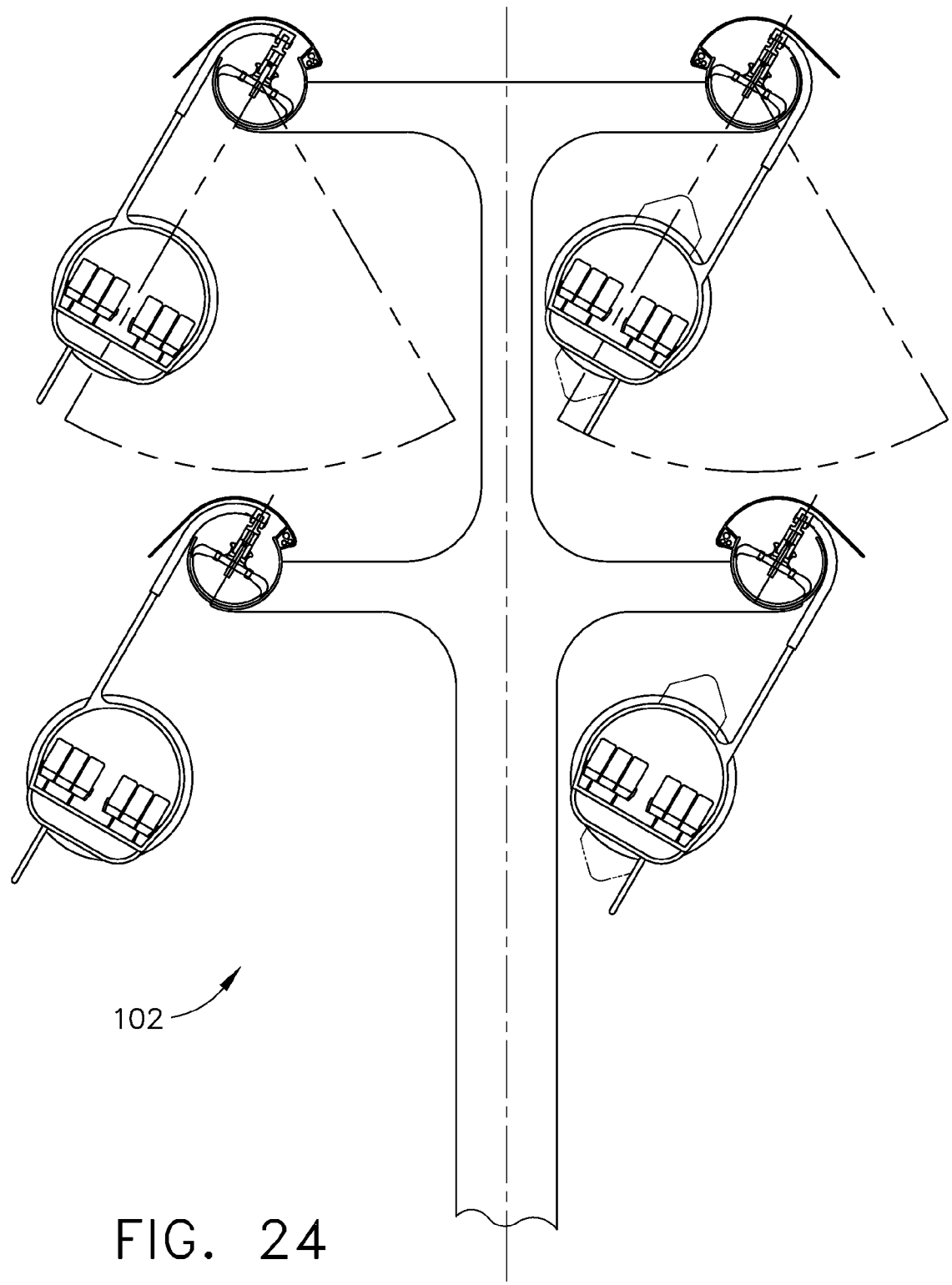
FIG. 24 is a cross-sectional view of another elevated guideway embodiment of the present invention.

These systems will graciously transverse all types of terrain without excavation due to these overhead installations. If the terrain is more than ordinarily difficult, single cable suspension bridges 100 may economically span large distances as shown in FIG. 23. Where a primary and secondary guideway must coexist, a tiered pillar system 102 can be utilized as is shown in FIG. 24. Other pillar systems can be constructed to facilitate multiple guideways as needed.

Figure 25:
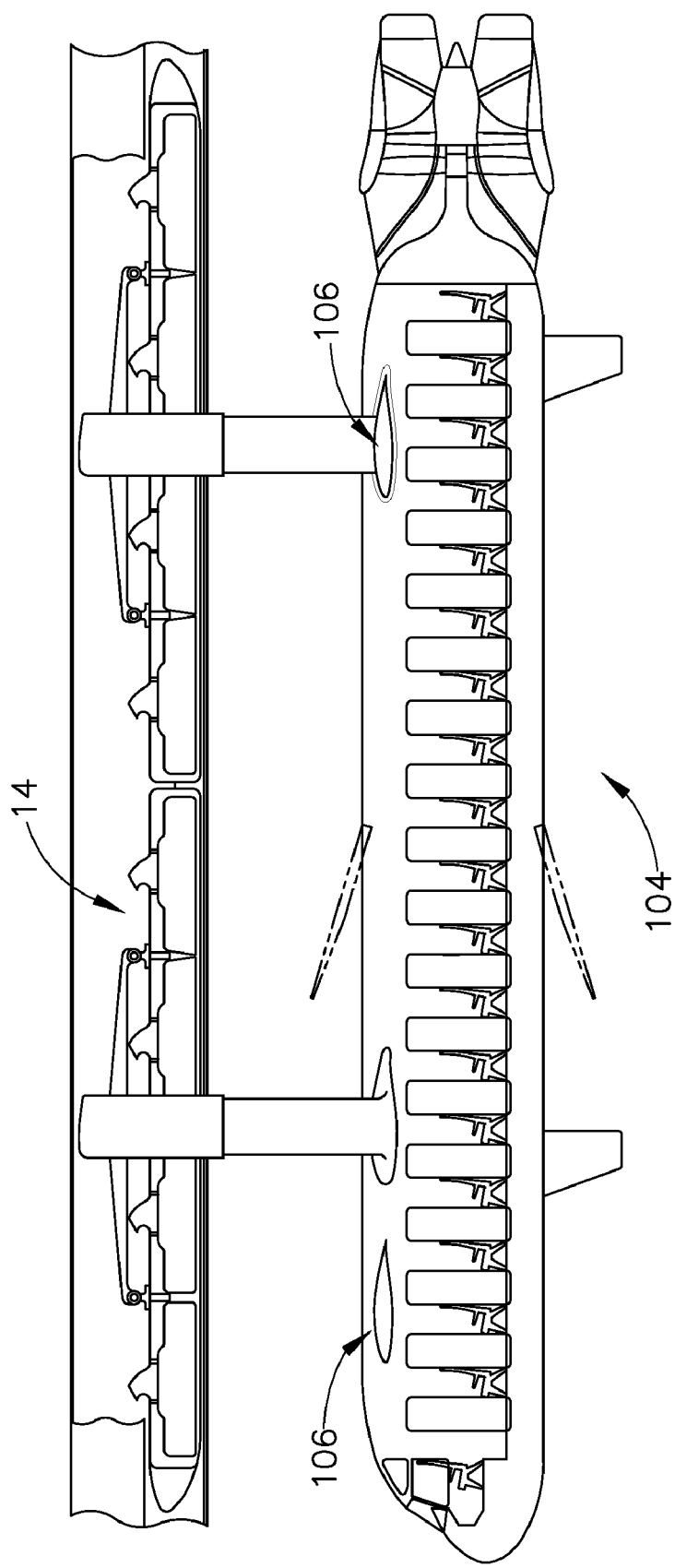
FIG. 25 is a side elevational view of another mass transit system embodiment of the present invention.
Figure 26:
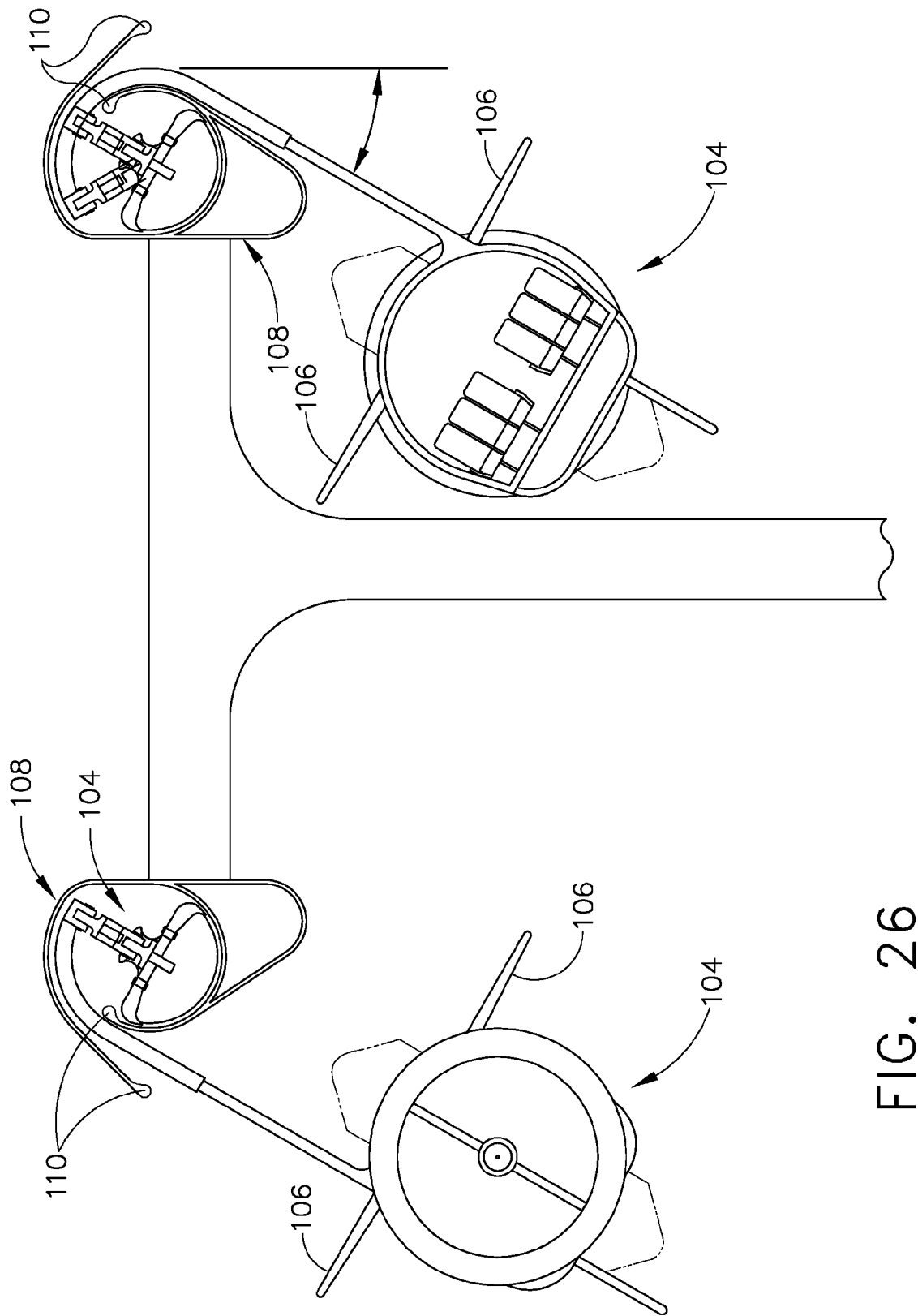
FIG. 26 is another cross-sectional view of another elevated guideway embodiment of the present invention.

An alternate embodiment 104 of the streamline vehicle 10 can incorporate a modified body shape that would add a lifting force to the vehicle at elevated speeds. A short span wing can be added to the vehicle at a mostly central location to produce a substantial lifting force without unbalancing the support provided by the truck system 14. Furthermore, tandem wings 106 can be utilized to further increase lift as is shown in FIGS. 25 and 26. Tandem wings 106 would incorporate known lift changing devices as needed for maintaining the dynamic longitudinal balance of the alternate streamline vehicle 104.

Figure 27:
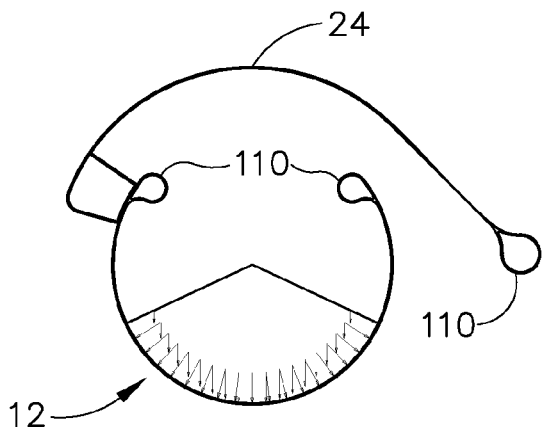
FIG. 27 is another cross-sectional view of another elevated guideway embodiment of the present invention.
Figure 28:
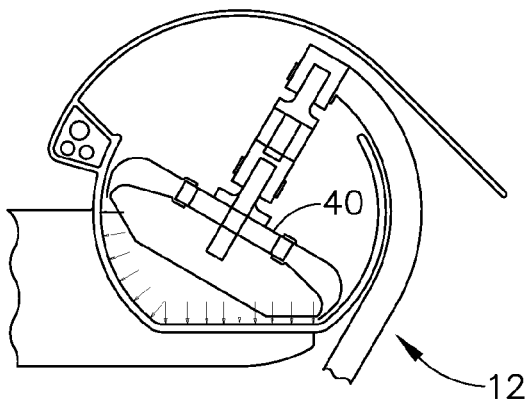
FIG. 28 is another cross-sectional view of another elevated guideway embodiment of the present invention.
Figure 29:
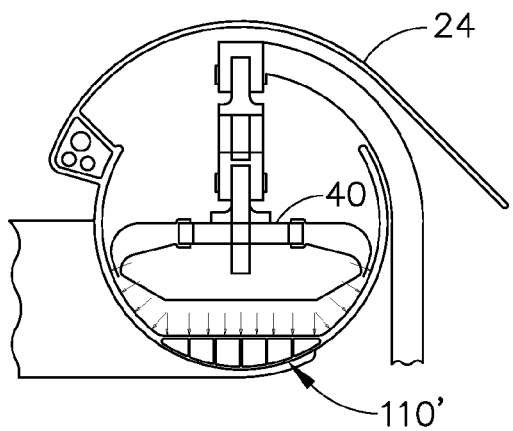
FIG. 29 is another cross-sectional view of another elevated guideway embodiment of the present invention.
Figure 30:
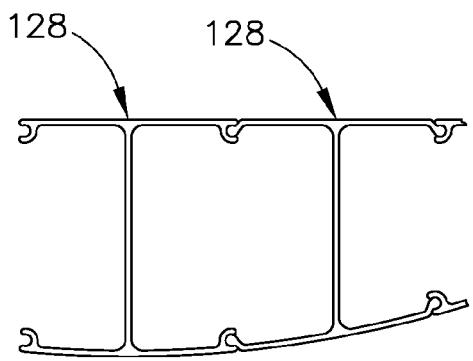
FIG. 30 is a cross-sectional view of a portion of another guideway embodiment of the present invention.
Figure 31:
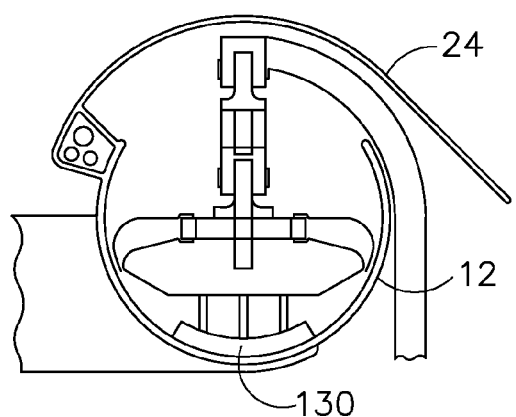
FIG. 31 is another cross-sectional view of another elevated guideway embodiment of the present invention.

An alternate guideway section 108, illustrated in FIG. 26, may increase guideway stiffness. Buckling margin can be added with the addition of stiffening material 110. Another form of stiffening formations 110 is shown in FIG. 27. Other modifications to the guideway cross-section can be employed to modify the guideway bending and buckling characteristics. One example is shown in FIGS. 28 and 29, wherein the bottom of the guideway is flat. This feature is possible since the vehicle is limited to + or −30 degrees of sway. This will change the pressure characteristics within the guideway and provide an opportunity to stiffen the structure as shown in FIG. 29. Although the guideway can be pultruded in one or two large pieces, it could also be advantageous to pultrude the guideway from a plurality of smaller discrete sections 128 as shown in FIG. 30, each configured to cooperate with physical requirements for a specific portion of the assembly. Discrete sections 128 are shown with a single rib although sections with multiple ribs could also be produced from, for example, carbon fiber and epoxy. Such rib formations can form stiffeners 110' as illustrated, for example, in FIG. 29. Other pultrusion materials such as, for example, carboxy-toughened epoxy/vinylester hybrid may be employed. Pultruded parts generally require use of a releasing agent in order to move through the die. The releasing agent typically prevents bonding if it is not removed abrasively. Since the releasing agent is commonly very thin, abrasive removal is usually not difficult. In some embodiments, for example, the entire guideway 12 and cover 24 is assembled from discrete sections 128 that are sanded and bonded together in a final assembly step using a conventional bonding agent. One advantage of this type of construction is more efficient use of material. Note that the bottoms of the ground cushion machines 40 do not have to be completely concentric with the guideway. Air pressure is more or less a constant within the peripheral column of the cushion. Consequently, the bottom of each air cushion machine 40 can take on whatever shape is necessary to provide for necessary equipment such as landing pads 130 which can also function as emergency friction brakes as indicated in FIG. 31. Various guideway embodiments may be fabricated from filament wound pipes. Such arrangement may be formed, for example, using long steel molds and resin impregnated fabric. Plastic sheeting may also be employed. During the forming process, the mold would be evacuated to compress the fabric and sheeting during the curing process.

Figure 32:
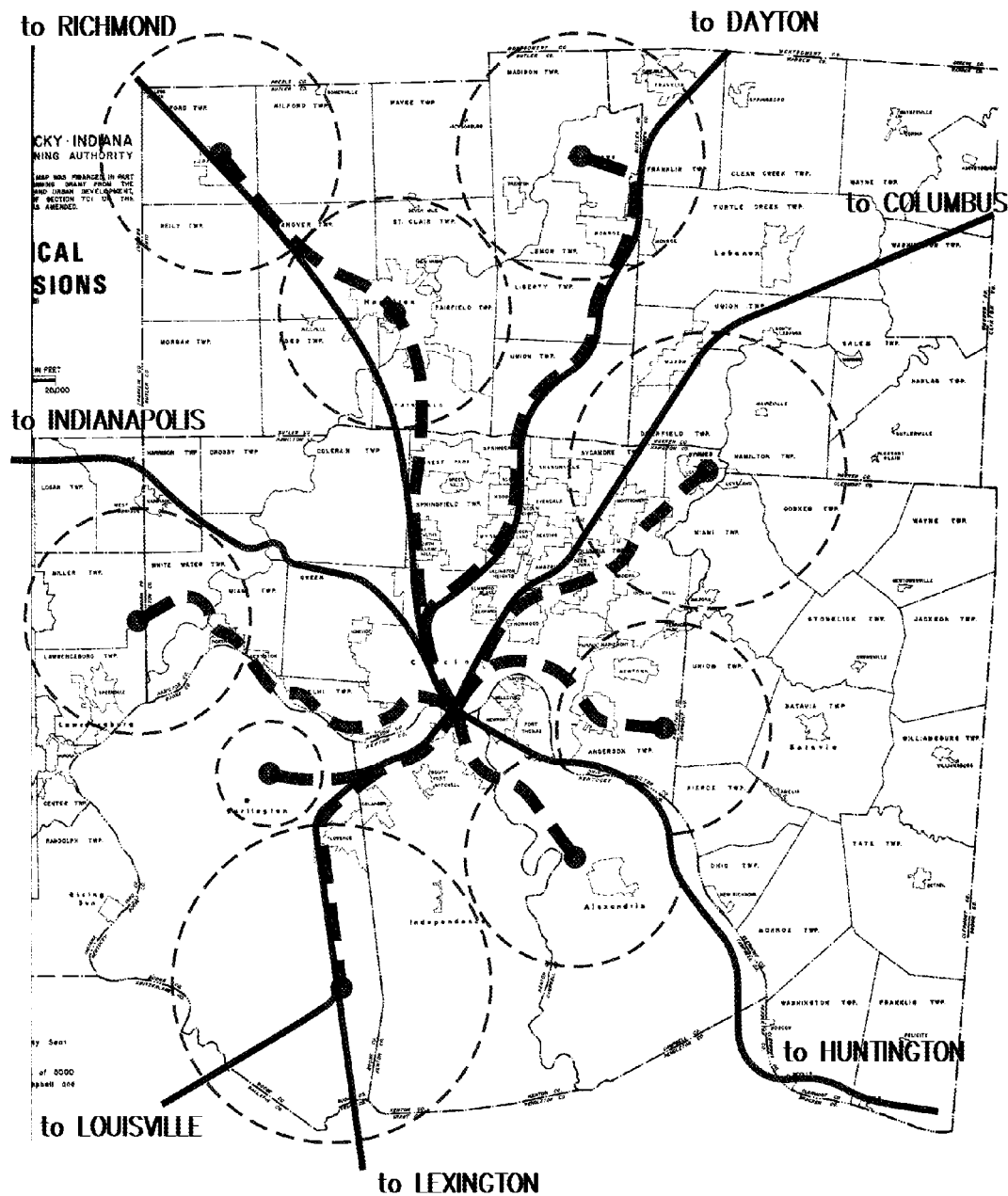
FIG. 32 illustrates an intra city network with inter city connections embodiment of the present invention.

FIG. 32 illustrates potential fundamentals for integrating an intercity network with an inner urban network using Cincinnati, Ohio as an example. Solid black lines indicate the intercity network connecting downtown Cincinnati to neighboring large cities. Smaller towns and population centers in the vicinity of Cincinnati are connected by a local system illustrated in heavy broken lines. Broken circles indicate nodal service areas. Nodal stations are fed by local bus, taxi, or personal transportation means. Most of the right-of-ways illustrated are existing corridors; major highways, rail, creek and river banks. Acquisition of new right-of-ways is greatly facilitated by the overhead nature of a visually appealing and quiet system.

It is anticipated that attainable speeds may be upward of 100 mph for intra urban nodal service and 150 to 200 mph for intercity service. At three to five minute intervals, it is estimated that various embodiments of this system may move 2 to 4 thousand people per hour. One minute intervals would enable 6000 people/hour to be accommodated. This would encourage many commuters to leave their cars at home and take the guideway. Freight trains would then be free to efficiently achieve their design intent, that is, move freight. Inner city expressways would then be free to move short haul commuters and freight.

Figure 33:
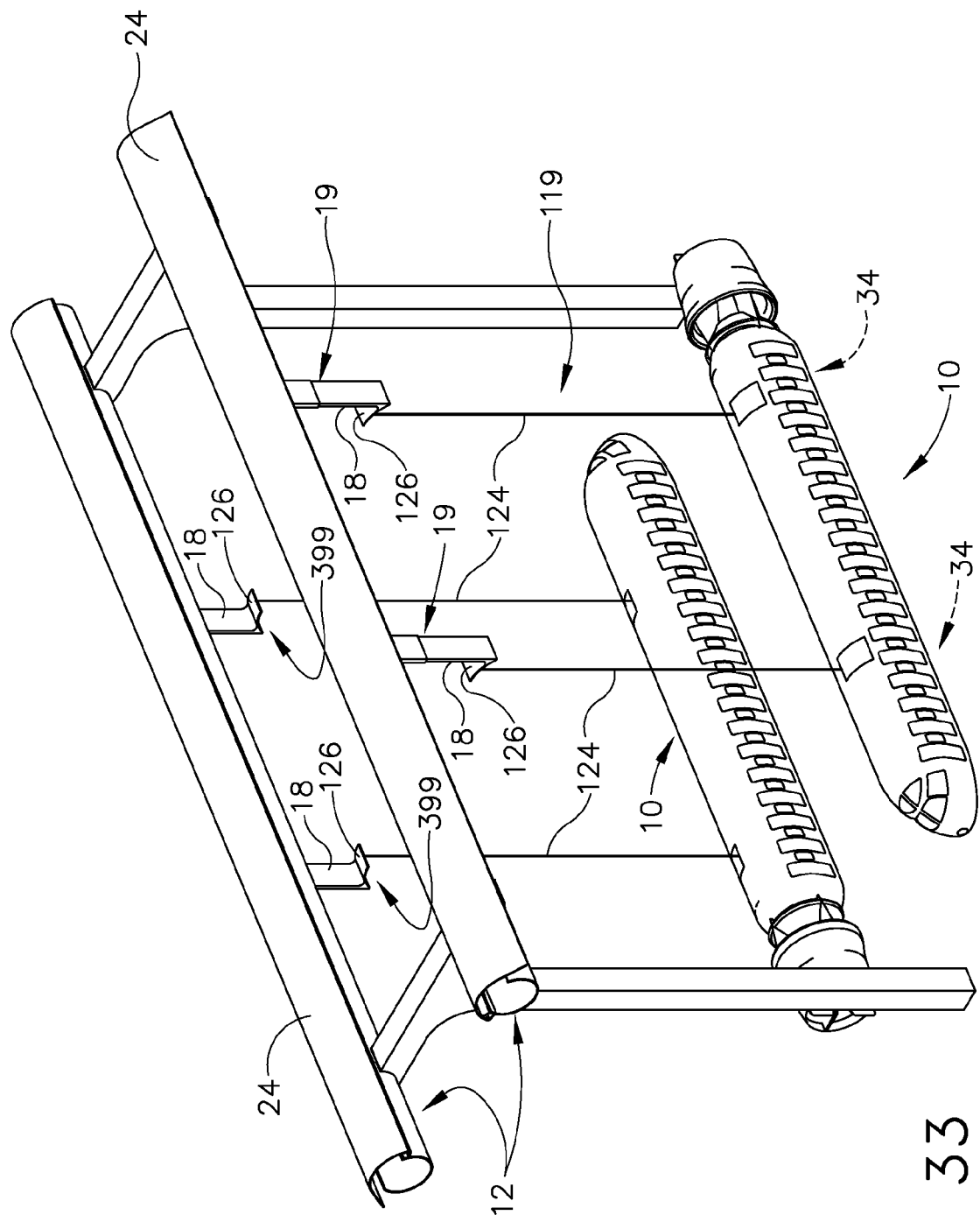
FIG. 33 is a perspective view of another mass transit system embodiment of the present invention with the emergency egress system deployed.

In emergency situations, provision must be made for removal of passengers and operators from the streamlined vehicles 10 in the event that any portion of the system becomes inoperative in places away from stations and terminals. FIG. 33 illustrates an emergency egress system embodiment of the present invention, generally designated as 119. A streamlined vehicle 10 is decoupled from its hangers 16 and automatically lowered to near proximity to the ground on tethers and/or cables 124 that are controlled by winch assemblies. The cable and winch assemblies emanate from hanger pads 126 such that the cables 124 are located on the vehicle's centerline. The hanger pads 126 are normally flush with the body of the streamlined vehicle and detachably attached thereto by, for example a detachable coupling 399.

In various embodiments the detachable coupling 399 includes at least two frame clevis mounts 400 that are mounted to the streamline vehicle 10 with a pin 402 fixedly attached between the tines thereof. See FIGS. 34 and 35. Hanger 18 is also provided with a clamp assembly 404 that grips pin 402 when double acting cylinder 406 is retracted. When cylinder 406 expands, clamp assembly 404 opens releasing pin 402. In conjunction and simultaneously with this action, stability pin 410 is retracted from eyelet 412 of hanger pads 126 as shown in the figure. Streamline vehicle 10 is free of hangers 18 and will descend via cable assembly 414. See FIGS. 36 and 37. Cable 416 is routed through hanger pad 126 to distal pulley 418 thereof. Cable 416 terminates at eyelet 420 at the centerline of streamline vehicle 10. The vehicle will descend according to power source 422 (integral electric motor) constructed inside drum 424 of cable assembly 414. The cable drum 424 may be located in other areas such as, for example, the top of the streamline vehicle 10 or on top of the spanner beam 42. The streamline vehicle 10 is thereby balanced and will descend in an upright orientation. Instead of power source 422, which is comprised of an electric motor and gear box, drum 424 could alternately incorporate a governor that would permit streamline vehicle 10 to descend without power. The powered approach is preferred since the empty streamline vehicle 10 could be raised and reattached to hanger pads 126 so the system could be conveniently cleared and restarted in a minimum amount of time. In various embodiments, the ventral fins 34 may be fashioned to selective fold over in order to permit the streamlined vehicle 10 to get close enough to the ground or other surface for easy egress. Small ladders or balloons may also be provided for each passenger or, for example, to accommodate egress in rough terrain.

One of the advantages of his invention is to pendulum hang an aerodynamically streamlined vehicle from an overhead guideway to provide the following:
  Passenger comfort provided by:
    Frequency of service
    Economical
    Speed
    Smooth ride
    Naturally coordinated turns
    Quiet transportation
  Structural simplicity of guideway:
    Elimination of guideway torque loads
    The guideway requires no banking through turns. It can be installed in a horizontal plane.
    Structurally lighter
  Structural simplicity of vehicle:
    Light weight since it is not airborne pressure vessels.
    Light weight since it does not have to fulfill ground vehicle standards.
  An all weather system since the guideway is covered.
    Dependability
  Greatly enhances right-of-way development.
    Low noise
    Visually appealing
    Overhead installation is much less intrusive. Amenable to coexistence.
  Standard existing technology:
    Lower initial cost
    Low maintenance
  For the high speed application the air cushion should be utilized. The advantages are:
    Smooth ride.
    Low noise level.
    No deformation of air cushion due to side slip, crosswind or surface discontinuities.
  If the vehicle is low speed, then wheels could provide:
    Electric drive.
    Lower noise.

The flexible guideway of various embodiments of the present invention departs from the norm in that all mass transit systems have historically used rigid rails. Rigid rail lines are normally laid on virgin ground or carefully constructed fills for continuous support. Where terrain does not permit this standard approach, steel bridges or concrete reinforced steel beams are used. If it is an elevated rail line then the rail bed would have to be a continuous assembly of concrete reinforced steel beams. This construction is prohibitively expensive. Various embodiments of the flexible guideway of the present invention comprise relatively lightweight structures. One significant advantage of the system is its economy of material and therefore affordable cost. For example, various system embodiments may employ a 110 foot long vehicle. In those arrangements, pylon or tower spacing will be a minimum of 110 feet, a vehicle length. However, it is conceivable that greater tower spacing may ultimately be attained. In various embodiments, each segment of the guideway spans between adjacent towers. In its simplest approach, each segment will be a simply supported beam at both ends with a uniformly distributed load across most of that length. In reality, the end support will not be simple since it will be tied into the following segment. Nevertheless, each guideway segment will deflect as the load passes as any ordinary structural beam would. The passing load will necessarily experience a downward acceleration. If left unattenuated, it will add to the vertical loads imposed on the guideway. As the load passes over a tower, the vehicle will be accelerated vertically upward, only to come down again with greater force. This oscillation will reach equilibrium as a function of guideway mechanical properties. The guideway would then necessarily be over designed. To mitigate this oscillation, the various hanger configurations of the present invention can be provided with mechanical feedback assemblies. Such a subsystem may, for example, utilize accelerometers, hydraulic cylinders and guided joints that will shorten and lengthen each hanger in response to guideway deflections. In so doing, one prevents the vehicle from accelerating upward or downward, thus relieving the guideway of additional loading. The passengers will reap a benefit as well; a smooth ride.

The various embodiments of the present invention represent a vast improvement over prior mass transit systems. While several embodiments of the invention have been described, it should be apparent, however, that various modifications, alterations and adaptations to those embodiments may occur to persons skilled in the art with the attainment of some or all of the advantages of the invention. For example, according to various embodiments, a single component may be replaced by multiple components, and multiple components may be replaced by a single component, to perform a given function or functions. This application is therefore intended to cover all such modifications, alterations and adaptations without departing from the scope and spirit of the disclosed invention as defined by the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. A suspended mass transit system, comprising:
a concave elevated guideway, said concave elevated guideway including a downwardly facing apex and an upwardly facing trough;
at least one truck movably supported within said guideway;
at least one hanger coupled to said at least one truck and a movable passenger vehicle for suspending said movable passenger vehicle from said at least one truck such that the movable passenger vehicle extends below the downwardly facing apex, said hanger having a dynamic joint configured to permit adjustment of a distance between the guideway and the passenger vehicle; and
a propulsion system for propelling the movable passenger vehicle along the elevated guideway.

2. The suspended mass transit system of claim 1 wherein said at least one truck comprises at least one air cushion machine that forms a substantially concentric cushion of air between the air cushion machine and said concave elevated guideway.

3. The suspended mass transit system of claim 2 wherein each said air cushion machine comprises a plenum for receiving said air from a source of air in communication therewith such that said air received in said plenum is directed out through at least one peripheral nozzle through a wall of said plenum and directed toward a concave inner surface within said guideway to form a substantially concentric cushion of air between said air cushion machine and said elevated guideway.

4. The suspended mass transit system of claim 3 wherein said at least one hanger has an upper portion that is movably coupled to said at least one truck assembly such that said upper portion of said hanger is free to pivot relative to said at least one truck assembly in horizontal and vertical planes.

5. The suspended mass transit system of claim 1 wherein said propulsion system comprises at least one propulsion generator supported on said passenger vehicle.

6. The suspended mass transit system of claim 1 wherein said guideway is fabricated from material selected from the group of materials consisting of nonmetal materials, metal materials, and composite nonmetal and metal materials.

7. The suspended mass transit system of claim 6 wherein said nonmetal material comprises pultruded composite material.

8. The suspended mass transit system of claim 7 wherein said guideway comprises a plurality of pultruded guideway segments that are bonded together at their respective edges.

9. The suspended mass transit system of claim 1 further comprising at least one frictional pad member attached to said at least one truck and in confronting relationship with a concave inner surface of said guideway.

10. The suspended mass transit system of claim 1 further comprising:
at least one other elevated guideway; and
at least one switch communicating between said elevated guideway and said at least one other elevated guideway.

11. The suspended mass transit system of claim 10 wherein said elevated guideway comprises a primary concave elevated guideway and wherein said at least one other elevated guideway comprises a secondary concave guideway elevated above said primary guideway and wherein said at least one switch comprises a concave switch rail supported relative to said primary and secondary guideways, said switch rail being selectively movable between a first position wherein a first end thereof is spaced away from said primary guideway and a second position wherein said first end of said switch rail is concentrically received within or in otherwise substantial longitudinal alignment with said primary guideway and a second end thereof is concentrically received within or is otherwise in substantial longitudinal alignment with a switching end of said secondary guideway to form a transition guideway between said primary guideway and said secondary guideway.

12. The suspended mass transit system of claim 11 wherein said switch rail is pivotally mounted relative to said primary guideway and said secondary guideway.

13. The suspended mass transit system of claim 12 wherein said switch rail is pivotally mounted relative to said primary guideway by a movable balance member such that movement of the balance member in one direction, said switch rail is moved to said first position and when said balance member is moved in an opposite direction, said switch rail is moved into said second position.

14. The suspended mass transit system of claim 1 further comprising at least one wing on said passenger vehicle.

15. The suspended mass transit system of claim 1 further comprising stiffeners on portions of said flexible concave elevated guideway.

16. The suspended mass transit system of claim 15 wherein said stiffeners comprise thickness variations in said elevated guideway.

17. The suspended mass transit system of claim 1 wherein said propulsion system comprises a plurality of powered wheels attached to said at least one truck in a concentric array and arranged to frictionally engage a concave inner surface of said concave elevated guideway.

18. The suspended mass transit system of claim 1 further comprising an emergency egress system comprising:
a selectively detachable coupling between said dynamic joint and said passenger vehicle; and
a tethering system coupled to said hanger and said passenger vehicle for lowering said passenger vehicle relative to the elevated guideway after the passenger vehicle has been decoupled from the at least one hanger.

19. The suspended mass transit system of claim 1 further comprising a weather cover over at least a portion of said guideway.

20. A suspended mass transit system, comprising:
a concave elevated guideway formed from a plurality of pultruded segments bonded together at their respective edges, said concave elevated guideway including a downwardly facing apex and an upwardly facing trough;
at least one hanger having an upper portion movably supported within said concave guideway;
a movable passenger vehicle coupled to a lower portion of said at least one hanger that extends below said elevated guideway; and
a propulsion system for propelling the movable passenger vehicle along the elevated guideway.

21. A suspended mass transit system, comprising:
a concave elevated guideway, said concave elevated guideway including a downwardly facing apex and an upwardly facing trough;
at least one hanger having an upper portion movably supported within said concave guideway;
a plurality of driven wheels operably supported in an arcuate array on said upper portion of said hanger in driving contact with a concave inner surface of said flexible concave elevated guideway; and
a passenger vehicle coupled to a lower portion of said at least one hanger that extends vertically below said downwardly facing apex of the elevated guideway.

22. A suspended mass transit system, comprising:
a concave elevated guideway;
at least one truck movably supported within said guideway;
at least one hanger coupled to said at least one truck and a movable passenger vehicle for suspending said movable passenger vehicle from said at least one truck, said hanger having a dynamic joint configured to permit adjustment of a vertical distance between the guideway and the passenger vehicle;
at least one frictional pad member attached to said at least one truck and in confronting relationship with a concave inner surface of said guideway; and
a propulsion system for propelling the movable passenger vehicle along the elevated guideway.

23. A suspended mass transit system, comprising:
a concave elevated guideway;
at least one other elevated guideway;
at least one switch communicating between said elevated guideway and said at least one other elevated guideway;
at least one truck movably supported within said guideway;
at least one hanger coupled to said at least one truck and a movable passenger vehicle for suspending said movable passenger vehicle from said at least one truck, said hanger having a dynamic joint configured to permit adjustment of a vertical distance between the guideway and the passenger vehicle; and
a propulsion system for propelling the movable passenger vehicle along the elevated guideway.

24. The suspended mass transit system of claim 23 wherein said elevated guideway comprises a primary concave elevated guideway and wherein said at least one other elevated guideway comprises a secondary concave guideway elevated above said primary guideway and wherein said at least one switch comprises a concave switch rail supported relative to said primary and secondary guideways, said switch rail being selectively movable between a first position wherein a first end thereof is spaced away from said primary guideway and a second position wherein said first end of said switch rail is concentrically received within or in otherwise substantial longitudinal alignment with said primary guideway and a second end thereof is concentrically received within or is otherwise in substantial longitudinal alignment with a switching end of said secondary guideway to form a transition guideway between said primary guideway and said secondary guideway.

25. The suspended mass transit system of claim 24 wherein said switch rail is pivotally mounted relative to said primary guideway and said secondary guideway.

26. The suspended mass transit system of claim 25 wherein said switch rail is pivotally mounted relative to said primary guideway by a movable balance member such that movement of the balance member in one direction, said switch rail is moved to said first position and when said balance member is moved in an opposite direction, said switch rail is moved into said second position.

27. A suspended mass transit system, comprising:
a concave elevated guideway;
at least one truck movably supported within said guideway;
at least one hanger coupled to said at least one truck and a movable passenger vehicle for suspending said movable passenger vehicle from said at least one truck, said hanger having a dynamic joint configured to permit adjustment of a distance between the guideway and the passenger vehicle;
a propulsion system for propelling the movable passenger vehicle along the elevated guideway; and
an emergency egress system comprising:
a selectively detachable coupling between said dynamic joint and said passenger vehicle; and
a tethering system coupled to said hanger and said passenger vehicle for lowering said passenger vehicle relative to the elevated guideway after the passenger vehicle has been decoupled from the at least one hanger.

28. A suspended mass transit system, comprising:
a concave elevated guideway comprising:
a primary concave elevated guideway and wherein said at least one other elevated guideway comprises a secondary concave guideway elevated above said primary guideway and wherein said at least one switch comprises a concave switch rail supported relative to said primary and secondary guideways, said switch rail being selectively movable between a first position wherein a first end thereof is spaced away from said primary guideway and a second position wherein said first end of said switch rail is concentrically received within or in otherwise substantial longitudinal alignment with said primary guideway and a second end thereof is concentrically received within or is otherwise in substantial longitudinal alignment with a switching end of said secondary guideway to form a transition guideway between said primary guideway and said secondary guideway and wherein said mass transit system further comprises:
at least one other elevated guideway;
at least one switch communicating between said elevated guideway and said at least one other elevated guideway;
at least one truck movably supported within said guideway;
at least one hanger coupled to said at least one truck and a movable passenger vehicle for suspending said movable passenger vehicle from said at least one truck, said hanger having a dynamic joint configured to permit adjustment of a distance between the guideway and the passenger vehicle; and
a propulsion system for propelling the movable passenger vehicle along the elevated guideway.

29. The suspended mass transit system of claim 28 wherein said switch rail is pivotally mounted relative to said primary guideway and said secondary guideway.

30. The suspended mass transit system of claim 29 wherein said switch rail is pivotally mounted relative to said primary guideway by a movable balance member such that movement of the balance member in one direction, said switch rail is moved to said first position and when said balance member is moved in an opposite direction, said switch rail is moved into said second position.

* * * * *